(12) United States Patent
Saad

(10) Patent No.: US 11,430,041 B2
(45) Date of Patent: Aug. 30, 2022

(54) DETERMINING DIVERSE RECOMMENDATIONS FROM DATA SEGMENTS

(71) Applicant: Adobe Inc., San Jose, CA (US)

(72) Inventor: Michele Saad, Austin, TX (US)

(73) Assignee: Adobe Inc., San Jose, CA (US)

( * ) Notice: Subject to any disclaimer, the term of this patent is extended or adjusted under 35 U.S.C. 154(b) by 319 days.

(21) Appl. No.: 16/829,410

(22) Filed: Mar. 25, 2020

(65) Prior Publication Data

US 2021/0304280 A1    Sep. 30, 2021

(51) Int. Cl.
| | | |
|---|---|---|
| *G06Q 30/00* | (2012.01) | |
| *G06Q 30/06* | (2012.01) | |
| *G06Q 30/02* | (2012.01) | |
| *G06F 16/903* | (2019.01) | |
| *G06K 9/62* | (2022.01) | |
| *G06N 20/00* | (2019.01) | |

(52) U.S. Cl.
CPC ... *G06Q 30/0631* (2013.01); *G06F 16/90335* (2019.01); *G06K 9/6215* (2013.01); *G06K 9/6221* (2013.01); *G06N 20/00* (2019.01); *G06Q 30/0282* (2013.01); *G06Q 30/0643* (2013.01)

(58) Field of Classification Search
None
See application file for complete search history.

(56) References Cited

U.S. PATENT DOCUMENTS 7,542,951 B1 * 6/2009 Chakrabarti .......... G06N 20/00
706/45
9,992,523 B1 * 6/2018 Chen ................. H04N 21/4782

OTHER PUBLICATIONS

"Reinforcement learning" Wikipedia; date downloaded Apr. 23, 2020; https://en.wikipedia.org/wiki/Reinforcement_learning#Exploration.
"Cluster analysis" date downloaded Apr. 23, 2020; https://en.wikipedia.org/wiki/Cluster_analysis#Algorithms.
Ifeoma Ojialor; Introduction to Segmentation and Clustering. A basic guide to understanding the concepts of Segmentation and Clustering. Dec. 11, 2019; https://towardsdatascience.com/introduction-to-segmentation-and-clustering-703b2ad2578a.
Peter Orbanz et al.; "Bayesian Nonparametric Models"; Encyclopedia of Machine Learning; 2010; https://www.stats.ox.ac.uk/~teh/research/npbayes/OrbTeh2010a.pdf.

* cited by examiner

*Primary Examiner* — Mila Airapetian
(74) *Attorney, Agent, or Firm* — Keller Preece PLLC

(57) ABSTRACT

This disclosure describes one or more embodiments of systems, methods, and non-transitory computer-readable media that determine a degree of diversification for item recommendations to a user based on the user's input and generate diverse item recommendations for the user according to the degree of diversification. For instance, the disclosed systems can receive a diversification metric from a client device based on a user interaction with a selectable tool (or another interactive element) in a graphical user interface. From among data segments representing users clustered according to item affinities, the disclosed systems can subsequently use the diversification metric to identify a data segment that is diverse from a reference data segment for the user. The disclosed systems further rank items associated with the diverse data segment to select an anomalous item as an item recommendation for display on the client device.

20 Claims, 13 Drawing Sheets

DETERMINING DIVERSE RECOMMENDATIONS FROM DATA SEGMENTS

BACKGROUND

In recent years, computing devices have increasingly used recommendation systems to generate content recommendations in part by executing analytics tools to categorize user behavior or characteristics. For instance, some existing recommendation systems can analyze user data to determine recommendations for digital images, video, or other content for users and provide the content recommendations to the users' computing devices. Such conventional recommendation systems provide content recommendations to a user device according to styles, tastes, and contexts associated with the user from data analytics tools. Although these conventional recommendation systems can determine and provide content recommendations, they have a number of technical shortcomings. For instance, some conventional systems inefficiently create informational echo chambers by repeatedly generating a same or similar type of content recommendation for a user. As a further example, conventional systems can also rigidly rely on historical data recording past user interactions with digital content to determine content recommendations—thereby reinforcing informational echo chambers.

SUMMARY

This disclosure describes one or more embodiments of systems, computer-readable media, and methods that solve the foregoing problems and provide other benefits. In some cases, the disclosed systems determine a degree of diversification for item recommendations to a user based on the user's input and generate diverse item recommendations for the user according to the degree of diversification. For example, the disclosed systems can generate data segments representing users according to item affinities clustered (in some cases) according to a machine-learning-clustering algorithm. The systems can further receive a diversification metric from a client device reflecting a degree of diversification in item recommendations based on a user interaction with a selectable tool (or another interactive element) in a graphical user interface. From among the data segments, the disclosed systems can subsequently use the diversification metric to identify a data segment that is diverse from a reference data segment for the user. The disclosed systems can further rank items associated with the diverse data segment to select an anomalous item as an item recommendation for display on the client device. By using a user-selected diversification metric for item recommendation preferences, the disclosed systems can efficiently and flexibly determine diverse item recommendations for users.

BRIEF DESCRIPTION OF THE DRAWINGS

The detailed description is described with reference to the accompanying drawings in which.

DETAILED DESCRIPTION

Figure 1:
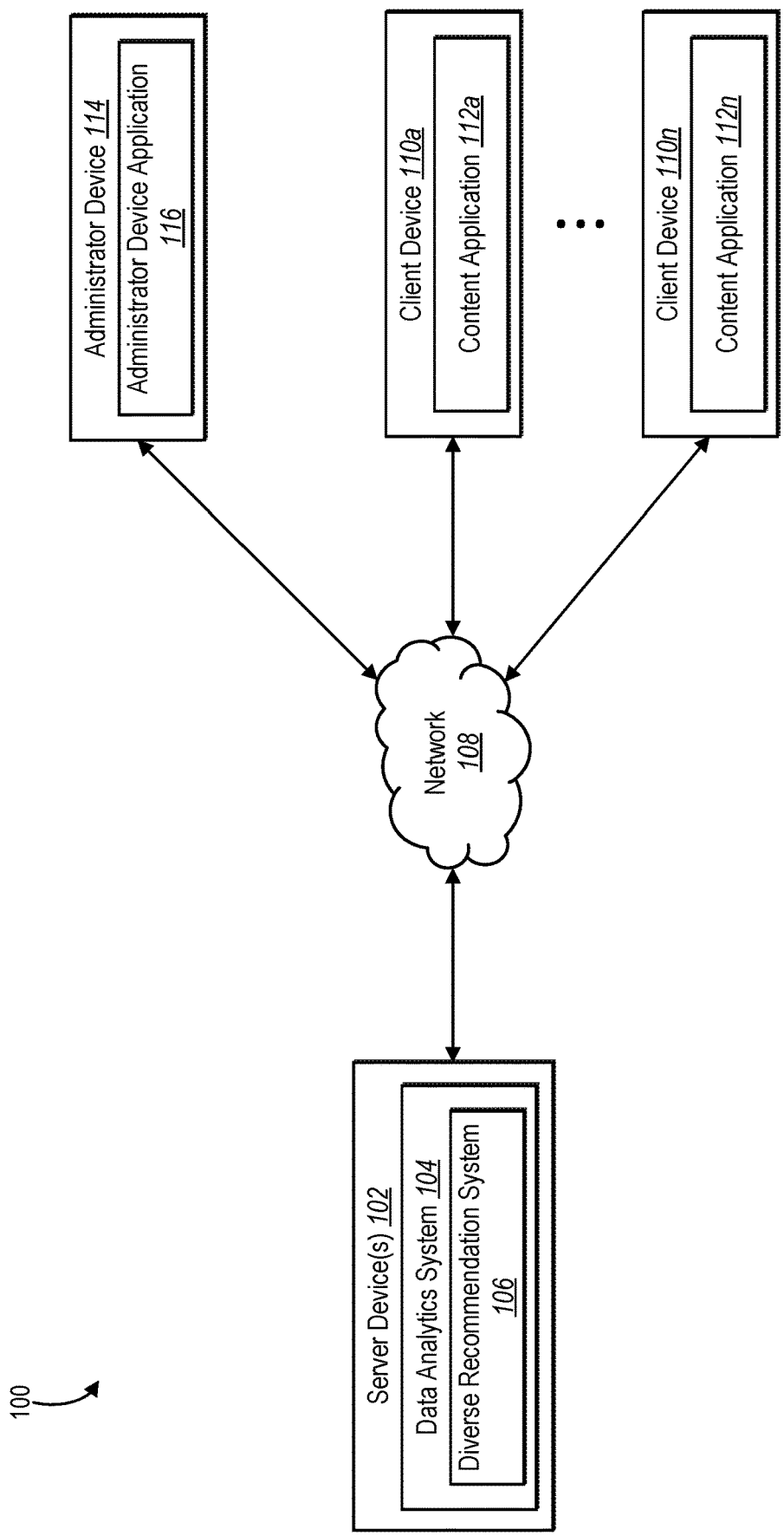
FIG. 1 illustrates a schematic diagram of an example system in which a data analytics system and a diverse recommendation system can operate in accordance with one or more embodiments.

The disclosure describes one or more embodiments of a diverse recommendation system that can determine a degree of diversification for item recommendations to a user based on the user's input and generate diverse item recommendations for the user according to the degree of diversification. For example, the diverse recommendation system can use a machine-learning-clustering algorithm to generate data segments that represent users (or other data) clustered according to affinities for particular items. The diverse recommendation system can further receive an indication from a client device of a selection by a user of a diversification metric reflecting a degree of diversification in item recommendations. Such a selection can come via a selectable-diversification tool within a customizable-recommendation-user interface. From among the data segments, the diverse recommendation system can further identify a diverse data segment within a threshold distance, as indicated by the diversification metric, of a reference data segment that corresponds to the user. The diverse recommendation system can further rank items associated with the diverse data segment and select an anomalous item for recommendation to the user from the ranked items. Subsequently, the diverse recommendation system provides the anomalous item as an item recommendation for display on the client device of the user.

As just mentioned, the diverse recommendation system can generate data segments. For example, the diverse recommendation system can generate data segments that represent users clustered according to affinities for particular items from a set of items. Such items may include products, media-content items, or various other items. In some embodiments, the diverse recommendation system utilizes user segmentation (or clustering) algorithms (e.g., machine-learning-clustering algorithms) to generate data segments, such as, but not limited to, unsupervised non-parametric clustering, domain expertise, non-supervised clustering seeded with domain expertise, or semi-supervised clustering seeded with domain expertise.

As also mentioned above, the diverse recommendation system can receive an indication from a client device of a diversification metric reflecting a degree of diversification in item recommendations. In some cases, the diverse recommendation system provides data to a client device for a graphical user interface with a selectable-diversification tool to configure diversification metrics (e.g., via a graphical user interface for item-recommendation-preference settings). Based on user interaction with the graphical user interface, the diverse recommendation system can receive an indication of a selection by a user of a diversification metric. In addition to (or as part of) receiving the diversification metric, the diverse recommendation system can also receive one or both of a frequency metric indicating a frequency with which the user receives recommendations of anomalous items and a time metric indicating a time period in which the user receives recommendations of anomalous items.

Upon receiving the diversification metric, the diverse recommendation system can identify, from among data segments, a diverse data segment within a threshold distance of a reference data segment. In some cases, the diversification metric indicates the threshold distance between the diverse data segment and the reference data segment. For example, the diverse recommendation system can identify a reference data segment that corresponds to the user from a plurality of data segments. The diverse recommendation system can further identify neighboring data segments within a threshold distance, as indicted by the diversification metric, from the reference data segment. From the identified neighboring data segments, the diverse recommendation system selects a data segment as the diverse data segment. In some embodiments, the diverse recommendation system selects the most diverse data segment (e.g., having the greatest distance from the reference data segment within the threshold distance) from among the neighboring data segments as the diverse data segment.

After identifying a diverse data segment, the diverse recommendation system can select an anomalous item for recommendation to the user corresponding to the identified diverse data segment. In particular, the diverse recommendation system can identify items associated with the diverse data segment, such as items associated with users in the diverse data segment. Subsequently, in some embodiments, the diverse recommendation system determines user-preference scores for the items based on one or both of preference factors for the items and weights based on user behavior of the user. Indeed, the diverse recommendation system can rank the items using the user-preference scores and select the highest ranked item as the anomalous item (e.g., the item having the highest user-preference score). The diverse recommendation system can further provide the anomalous item as a diverse item recommendation for display on a client device in a variety of contexts, such as recommendations on a website or in-application recommendations.

As an illustration, the diverse recommendation system can generate data segments that represent users clustered according to affinities for particular clothing products from a set of clothing products (as the items) utilizing user data and item data of an e-commerce website. On the e-commerce website, the diverse recommendation system can provide data for a customizable-recommendation-user interface with a selectable-diversification tool (or option) to receive a selection of a diversification metric reflecting a degree of diversification in clothing product recommendations. Then, the diverse recommendation system can utilize the diversification metric to identify a diverse data segment (e.g., corresponding to a diverse clothing style) that is within a threshold distance of a reference data segment (e.g., corresponding to a clothing style that the user has an affinity towards). Based on the diverse data segment, the diverse recommendation system can select a clothing item (e.g., a popular item in the diverse data segment using user-preference scores) as the anomalous (or diverse) item and provide the clothing item as a diverse item recommendation to the user's client device.

As suggested above, many conventional recommendation systems inefficiently create informational echo chambers by repeatedly generating a same or similar type of content recommendation for a user and rigidly following algorithms that reinforce such echo chambers. For instance, conventional recommendation systems often determine content recommendations for users using information from past user interactions with content. By using information from past user interactions, many conventional recommendation systems generate analogous or homogenous content recommendations of the same or similar type of content.

When determining and providing analogous or homogenous content recommendations to users, conventional recommendation systems often generate computing inefficiencies. To reduce homogenous content recommendations, for instance, some conventional recommendation systems purge user data (or enable a user to purge user data such as cookies) to reset how and what type of content recommendations are provided to the user. Such conventional recommendation systems inefficiently utilize memory, processing time, and other computing resources by having to repetitively collect user data and terminate the use of that user data to make non-analogous or non-homogenous content recommendations. By purging or disregarding available user data to make non-analogous or non-homogenous content recommendations, some conventional recommendation systems inefficiently store user data that is being underutilized, relearn user affinities to content, and/or provide inaccurate content recommendations while relearning.

In addition to such computing inefficiencies, by generating analogous or homogenous content recommendations, some conventional recommendation systems repeatedly determine and present content recommendations that have already been seen or acted upon by a user (e.g., via another source). By providing repetitive or similar content recommendations that are not utilized or interacted with by the user, conventional recommendation systems often inefficiently utilize computing resources by using repetitive transmissions over a network—or back-and-forth communications for content requests over a network—to send the same or similar digital content. Such repetitive communications are inefficient uses of computing inputs and data repeatedly consuming portions of a network's bandwidth.

In addition to computing or network inefficiencies, some conventional recommendation systems rigidly follow recommendation algorithms that reinforce the echo chamber effect of same or similar content recommendations. Due to the complex nature of many conventional recommendation systems, for instance, conventional recommendation systems are not easily configurable to reduce homogenous content recommendations. Rather than adjusting recommendations, conventional systems can repeatedly rely on tracked user interactions with videos, websites, and other digital content to create the same or similar recommendations tied to the same types of user interactions. As just mentioned, some conventional recommendation systems purge user data (or enable a user to purge user data) to reduce informational echo chambers caused by homogenous content recommendations at the cost of underutilizing the purged user data. Even if users reset existing cookies (or other user data) to reduce homogenous content recommendations, some conventional recommendation systems apply the same rigid algorithm based on tracked user interactions to generate a new echo chamber of the same or similar content recommendations.

The disclosed diverse recommendation system provides several advantages over conventional systems by determining diverse item recommendations using an adjustable or selectable diversification metric. For example, the diverse recommendation system avoids and solves the informational echo chambers resulting from conventional machine-learning algorithms by providing a graphical-user-interface tool to easily adjust and control a degree of diversification for item recommendations. As noted above, some conventional machine-learning algorithms learn inferences for a user based on a self-perpetuating user dataset to create echo chambers of the same or similar item recommendations. Unlike conventional machine-learning algorithms that repetitively provide content recommendations learned from a single data cluster, the diverse recommendation system can both generate data segments using a machine-learning-clustering algorithm and capture a variety of item recommendations from diverse data segments by using an adjustable diversification metric customized with a selectable-diversification tool. In addition to more flexibly adjusting the diversity of item recommendations, in some cases, the diverse recommendation system provides tools to adjust one or both of the frequency and time periods with which a system provides diverse item recommendations corresponding to diverse segments.

In addition to improved flexibility, the diverse recommendation system improves the efficiency of computing devices that use conventional machine-learning algorithms for item recommendations. By determining and providing diverse item recommendations based on a user specified degree of diversification, the diverse recommendation system can deliver anomalous item recommendations on computing devices and—in contrast to conventional systems—avoid purging and relearning user data to select item recommendations. Unlike conventional recommendation systems, the diverse recommendation system can determine a degree of diversification for item recommendations based on a user's selection or other input and generate diverse item recommendations according to the degree of diversification, thereby exposing users to diverse content not previously seen or acted upon.

By diversifying item recommendations, the diverse recommendation system more efficiently uses computational resources to generate content recommendations. For instance, the diverse recommendation system efficiently utilizes user data to determine item recommendations. In contrast to some conventional systems, the diverse recommendation system can determine diverse item recommendations (e.g., non-homogenous item recommendations) without having to purge user data or terminate the use of already obtained user data. By utilizing a user specified degree of diversification to determine a diverse data segment and an anomalous item corresponding to that diverse data segment, the diverse recommendation system can determine and provide diverse item recommendations while continuing to utilize existing stored user data or without relearning user affinities to items.

In addition to more efficient use of computing resources, in some embodiments, the diverse recommendation system also provides interactive elements within a graphical user interface that introduces a novel functionality—quickly and efficiently facilitating the configuration of a diversification metric that reflects a degree of diversification in item recommendations. Unlike conventional graphical user interfaces that lack tools for user input for item recommendations, in some cases, the diverse recommendation system provides a selectable-diversification tool within a customizable-recommendation-user interface that (upon user interaction) changes the degree of diversification in item recommendations. By providing the selectable-diversification tool within a customizable-recommendation-user interface, the diverse recommendation system can determine and provide diverse item recommendations to users tailored to a user's diversification preferences—thereby more efficiently delivering customized and diverse item recommendations without users purging cookies (or user data) or purging or ignoring existing user data.

As indicated by the foregoing discussion, this disclosure describes various features and advantages of the diverse recommendation system. As used in this disclosure, a data segment includes a group or cluster of data points corresponding to one or more characteristics or events. In particular, a data segment can include a group of multidimensional datapoints representing users clustered according to characteristics or tracked user behavior over a network. In particular, a data segment can include a group of multidimensional data points representing users clustered according to affinities for particular items. More specifically, a data segment can include a cluster of users (as multidimensional datapoints) that share similarities in their affinities for particular items (e.g., a similar style, similar genre, similar category).

Additionally, as used in this disclosure, an item includes an object, digital content, or a service. In particular, an item can include an object, digital content, or a service that is viewable, obtainable, or accessible by a user. For instance, items can include products (e.g., clothing, electronics, food), software programs and/or applications (e.g., mobile phone applications, computer applications), media-content items such as, but not limited to images, videos, articles, website links, graphic-based assets, and/or services (e.g., hotels, airline flights, lessons).

Additionally, as used in this disclosure, an item recommendation includes a digital communication or graphical representation describing, portraying, or representing an item or information associated with the item. In particular, an item recommendation can include a digital communication or graphical representation of an item or information corresponding to the item using, but not limited to, an online advertisement, an email, Multimedia Messaging Service ("MMS"), Short Message Service ("SMS"), social-networking post, text, links, and/or selectable elements associated with items for display within a graphical user interface.

Furthermore, as used in this disclosure, an anomalous item includes an item diverse or different from items preferred, viewed, or interacted with by a user. In particular, an anomalous item can include an item corresponding to a diverse data segment that is distinct from particular items corresponding to a reference data segment corresponding to a user. Indeed, an anomalous item can include an item selected from a set of items corresponding to user datapoints from a diverse data segment, such as an item from a set of items with which users in a diverse data segment share a strong affinity. Similarly, an anomalous item can include an item selected from such a diverse data segment, as described below.

As used in this disclosure, a diversification metric includes a value reflecting a degree or amount of diversification in an item recommendation. In particular, a diversification metric can include a value indicating a distance value between a reference data segment corresponding to a user and a diverse data segment or a distance value between a data point from a reference data segment corresponding to a user and another data point from a diverse data segment.

As used in this disclosure, a distance or a distance value includes a value that represents an amount of space or values along one or more axes between data points or data segments within multidimensional space. In particular, a distance can include a value that represents the amount of space between various combinations of data points, center points of clusters, cluster edges within a multidimensional space. For instance, a distance value can represent a quantification of similarities or dissimilarities between entities (e.g., datapoints, clusters). In some embodiments, a shorter distance between two entities in a multidimensional space can represent a greater similarity between the two entities (e.g., a short distance between the center point of two clusters can represent that the two clusters are similar).

As used in this disclosure, a frequency metric includes a value that represents a rate of occurrences. In particular, a frequency metric can include a value that indicates a frequency with which a user receives item recommendations. Moreover, a frequency metric can include a value that indicates a frequency with which a user receives recommendations of anomalous items. For example, a frequency metric can include a time based rate (e.g., once per day, twice per day, once per week, once per month).

As used in this disclosure, a time metric includes a value representing a time period. In particular, a time metric can include a value that indicates a time period in which the user receives item recommendations. More specifically, a time metric can include a value that indicates a time period in which a user receives recommendations of anomalous items. For instance, a time metric can include a time value (e.g., ten hours, three days, two weeks, two months).

As used in this disclosure, a user-preference score includes a score representing a preference and/or relevance of an item for a user. In particular, a user-preference score can include a value corresponding to a count of an item that has been purchased, clicked, downloaded, viewed, listened to, selected, searched for, or consumed. For example, a user-preference score can be determined for an item using an evaluation of preference factors corresponding to the item, such as various combinations of one or more of purchases, downloads, views, listens, selections, searches, or consumptions.

As used in this disclosure, item data includes information corresponding to an item. In particular, item data can include information corresponding to characteristics and/or attributes of a product (e.g., color, size, product ID, weight, price) or a media-content item (e.g., title, genre, category, data format, data size, streaming quality, rating). Additionally, item data can include preference factors for the item. Moreover, as used in this disclosure, a preference factor (i.e., an item preference factor) includes a characteristic and/or attribute corresponding to an item that is utilized to determine a user-preference score for the item. For example, a preference factor can include, but is not limited to, clicks on websites associated with a particular item, downloads of a particular item, listens of a particular item, purchases of the particular item, available quantity of the particular item, views of the particular item, selections of a particular item, searches for a particular item, pricing of the particular item, interaction trends associated with the particular item, and/or other user interactions with the particular item.

As used in this disclosure, user data includes information corresponding to a user. In particular, user data can include information corresponding to characteristics and/or attributes of a user. For example, user data can include user demographic data (geographic location, gender, age), user client device data (e.g., device type, OS type), and/or user behavior data. Furthermore, as used in this disclosure, user behavior (i.e., user behavior data) includes interactions associated with a user. In particular, user behavior can include interactions of a user in relation to a set of items and/or an entity associated with the set of items. For example, user behavior can include interactions of a user within an e-commerce website (e.g., purchases, views, visits) with products (e.g., items) of the e-commerce website. Additionally, user behavior can include interactions of a user within a media-content streaming application (e.g., clicks, views, saves, downloads) with media-content (e.g., video streams) of the media-content streaming application.

As used in this disclosure, a slider tool includes an interactive element within a graphical user interface that can be adjusted to modify a value. In particular, a slider tool can include an interactive element within a graphical user interface that facilitates the selection of a value by adjusting or sliding the element (e.g., via a touchscreen interaction, cursor interaction) to change the value. For example, the diverse recommendation system can provide a slider tool within a customizable-recommendation-user interface to adjust a value associated with a diversification metric, frequency metric, and/or a time metric for diverse item recommendations.

As used in this disclosure, a clustering algorithm (or a machine-learning-clustering algorithm) includes a method for grouping datapoints based on data or descriptors corresponding to the datapoints. In particular, a clustering algorithm can include a method for using distances between datapoints, that represent a degree of similarity between the datapoints (e.g., determined using statistical analysis, machine learning), to group similar datapoints near each other in a multidimensional space. For example, the diverse recommendation system can utilize a clustering algorithm to cluster datapoints corresponding to users that have similar affinities towards particular items. In addition, a clustering algorithm can include, but is not limited to, Bayesian non-parametric clustering (e.g., unsupervised), k-means clustering, mean-shift clustering, density based spatial clustering, gaussian-based clustering, and/or hierarchical clustering. For instance, a clustering algorithm can include a non-supervised clustering algorithm seeded with domain expertise or a semi-supervised clustering algorithm with domain expertise. Furthermore, as used in this disclosure, an unsupervised non-parametric clustering algorithm includes a clustering algorithm that utilizes any variety of variables (e.g., infinite dimensions) to group (or cluster) datapoints without utilizing a target variable.

Turning now to the figures, FIG. 1 illustrates a schematic diagram of a system 100 (or environment) in which a diverse recommendation system 106 can operate in accordance with one more embodiments. As illustrated in FIG. 1, the system 100 includes server device(s) 102, a network 108, an administrator device 114, and client devices 110a-110n. As further illustrated in FIG. 1, the one or more components of the system 100 can communicate with each other (e.g., via network 108 and/or directly).

As illustrated in FIG. 1, the server device(s) 102 can include a variety of types of computing devices, including those explained below with reference to FIG. 9. The server device(s) 102 can include a data analytics system 104 which further includes the diverse recommendation system 106. The diverse recommendation system 106 (via server device(s) 102) can store, identify, generate, retrieve, and/or utilize a variety of user data, item data, segmentation data, clustering algorithms and/or models, graphical user interfaces (for recommendation preferences and/or item recommendations), and/or diversification metrics. In addition, the diverse recommendation system 106 can utilize a diversification metric to identify a diverse data segment and/or a diverse (or anomalous) item recommendation for a user (as described below).

Furthermore, as mentioned above and as shown in FIG. 1, the system 100 includes the administrator device 114. In one or more embodiments, the administrator device 114 may include, but is not limited to, a mobile device (e.g., a smartphone, tablet), a laptop, a desktop, or another type of computing device as described below with reference to FIG. 9. In one or more embodiments, the administrator device 114 can host, provide, and/or communicate a platform (e.g., a website, application, digital service) to users (of client devices 110a-110n). Indeed, in some embodiments, the administrator device 114 stores, generates, and/or retrieves user data, item data, and/or segmentation data from communications with the client devices 110a-110n via a platform (e.g., an e-commerce website and/or application). For instance, the administrator device 114 can provide user data, item data, and/or segmentation data to the diverse recommendation system 106 (via server device(s) 102) to determine an anomalous item recommendation in accordance with one or more embodiments herein.

In addition, as shown in FIG. 1, the system 100 includes the client devices 110a-110n. In some embodiments, the client devices 110a-110n may include but are not limited to, a mobile device (e.g., a smartphone, tablet), a laptop, a desktop, or another type of computing device as described below with reference to FIG. 9. In one or more embodiments, users of the client devices 110a-110n can interact with platforms (e.g., website, application, digital service) to provide user data (or interactions) to the administrator device 114 and/or server device(s) 102. Moreover, the client devices 110a-110n can receive and display graphical user interfaces that obtain information such as diversification metrics, frequency metrics, and/or time metrics to provide to the diverse recommendation system 106 (via the administrator device 114 and/or server device(s) 102). Furthermore, the client devices 110a-110n can receive item recommendations (for display to users) from the administrator device 114 and/or server device(s) 102.

To access the functionalities of the diverse recommendation system 106, in certain embodiments, an administrator interacts with an administrator device application 116 on the administrator device 114. Similarly, to provide user data, selection data, or to access other functions (e.g., item recommendations) of the data analytics system 104, in some implementations, users interact with content applications 112a-112n on the client devices 110a-110n, respectively. For example, the administrator device application 116 and/or the content applications 112a-112n can be software applications (e.g., for the platforms mentioned above) installed on the administrator device 114 and/or the client devices 110a-110n, respectively, or a software application hosted on the server device(s) 102. In addition, when hosted on the server device(s) 102, the administrator device application 116 and/or the content applications 112a-112n can be accessed by the administrator device 114 and/or the client devices 110a-110n through a web browser.

Additionally, as shown in FIG. 1, the system 100 includes the network 108. As mentioned above, the network 108 can enable communication between components of the system 100. In one or more embodiments, the network 108 may include a suitable network and may communicate using any communication platforms and technologies suitable for transporting data and/or communication signals, examples of which are described with reference to FIG. 9. Furthermore, although FIG. 1 illustrates the server device(s) 102, administrator device 114, and the client devices 110a-110n communicating via the network 108, the various components of the system 100 can communicate and/or interact via other methods (e.g., the server device(s) 102 and the administrator device 114 can communicate directly).

As an overview of the diverse recommendation system, a client device from the client devices 110a-110n (associated with a user) interacts with a platform (e.g., an e-commerce website) hosted by the administrator device 114 to provide user data (e.g., interactions with items) and/or item recommendation preferences (e.g., a diversification metric via a selectable-diversification tool). The administrator device 114 can provide the user data, item data, and the diversification metric for one or more users to the diverse recommendation system 106 (via the server device(s) 102). Subsequently, the diverse recommendation system 106 utilizes data segments (associated with items and users of the platform hosted by the administrator device 114) with the diversification metric to determine an anomalous item for the user (in accordance with one or more embodiments herein). Then, the administrator device 114 can generate a diverse item recommendation for the determined anomalous item and provide the diverse item recommendation to the user.

Although FIG. 1 illustrates the diverse recommendation system 106 being implemented by a particular component and/or device (e.g., server device(s) 102) within the system 100. But the diverse recommendation system 106 (and/or the data analytics system 104) can be implemented, in whole or in part, by other computing devices and/or components in the system 100. For example, the diverse recommendation system 106 (and/or the data analytics system 104) can be implemented in whole, or in part, by the administrator device 114.

Figure 2A:
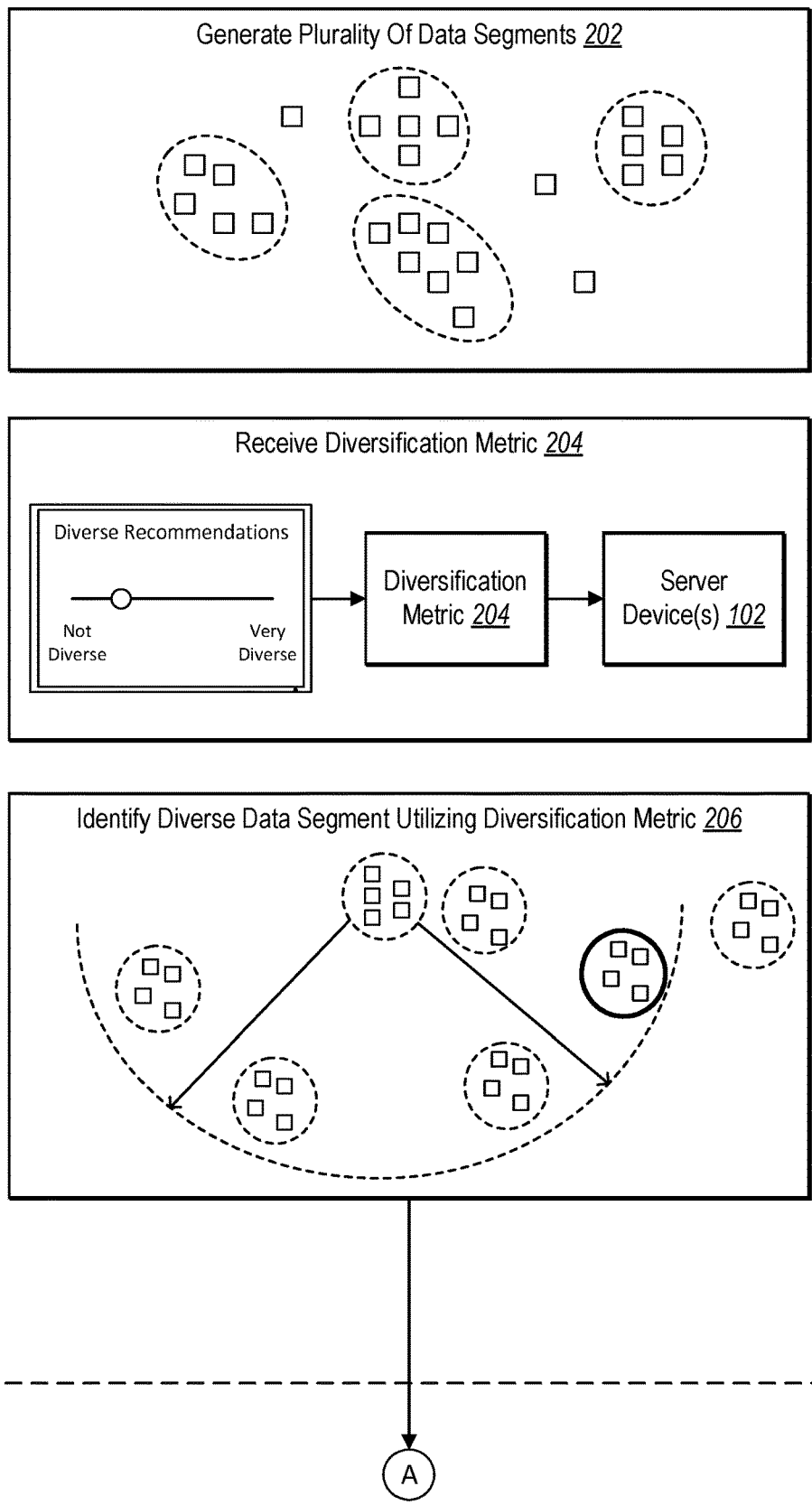
FIGS. 2A-2B illustrate an overview of a diverse recommendation system determining a diverse item recommendation in accordance with one or more embodiments.
Figure 2B:
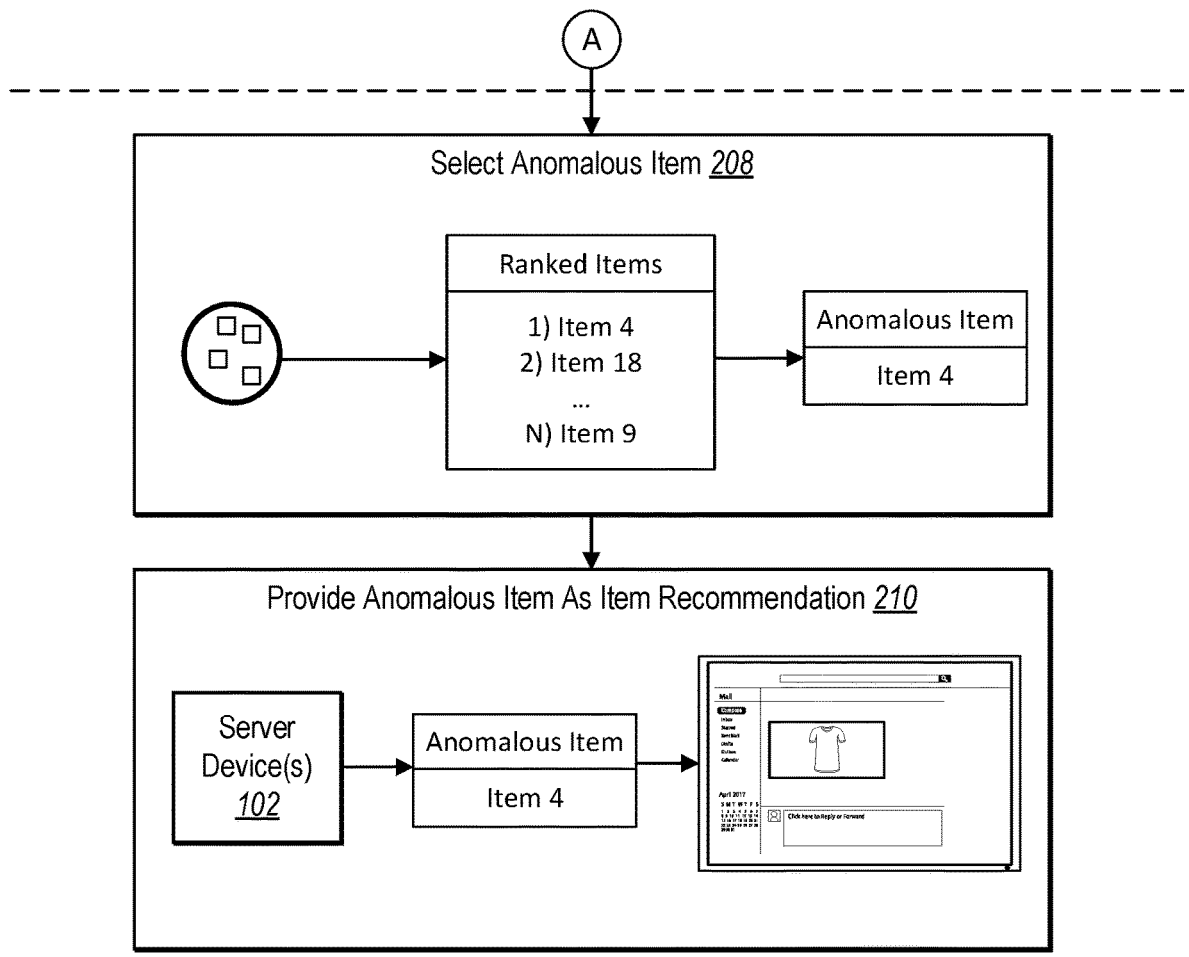

As mentioned above, the diverse recommendation system 106 can determine (or select) an anomalous item for recommendation to a user. For example, FIGS. 2A-2B illustrate an overview of the diverse recommendation system 106 selecting an anomalous item for recommendation to a user in accordance with one or more embodiments. More specifically, FIGS. 2A-2B illustrate a flowchart of the diverse recommendation system 106 generating a plurality of data segments, receiving a diversification metric, identifying a diverse data segment, selecting an anomalous item, and providing the anomalous item as an item recommendation to a client device.

For instance, as shown in FIG. 2A, the diverse recommendation system 106 generates a plurality of data segments in an act 202. Indeed, the diverse recommendation system 106 can utilize a dataset for a set of users and a dataset for a set of items to identify user data and corresponding item data for each user (e.g., interactions with items). Subsequently, the diverse recommendation system 106 can generate data segments by clustering particular users from the set of users according to affinities to particular items from the set of items (e.g., to cluster users that have an affinity towards similar items). Indeed, in one or more embodiments, the diverse recommendation system 106 utilizes a clustering algorithm to cluster users according to affinities for particular items. Additional detail regarding the diverse recommendation system 106 generating data segments is provided below (e.g., in relation to FIG. 3).

Furthermore, as shown in FIG. 2A, the diverse recommendation system 106 receives a diversification metric in an act 204. In particular, as shown in FIG. 2A, the diverse recommendation system 106 can generate data for a customizable-recommendation-user interface with a selectable-diversification tool for display on a client device. Afterwards, the diverse recommendation system 106 can receive (via the server device(s) 102 or receivers for the server device(s) 102), from the client device via user interaction with the selectable-diversification tool within the customizable-recommendation-user interface, a diversification metric (e.g., as a numerical value). Indeed, as illustrated in FIG. 2A, the selectable-diversification tool can include a slider tool with a range of values for the diversification metric. The diverse recommendation system 106 can also receive a frequency metric and/or a time metric from a client device. Additional detail regarding the diversification metric and customizable-recommendation-user interfaces to select a diversification metric is provided below (e.g., in relation to FIGS. 4A and 4B).

Additionally, as shown in FIG. 2A, the diverse recommendation system 106 identifies a diverse data segment utilizing a diversification metric in an act 206. More specifically, as shown in FIG. 2A, the diverse recommendation system 106 can identify a reference data segment and identify a diverse data segment that is a threshold distance within the reference data segment as indicated by the diversification metric. Indeed, the diverse recommendation system 106 can utilize the diversification metric to determine the threshold distance and identify data segments within a multidimensional space that are within the threshold distance from the reference data segment. As shown in FIG. 2A, the diverse recommendation system 106 identifies a data segment that is furthest in distance from the reference data segment while still within the threshold distance (e.g., indicated by the illustrated arrow) as the diverse data segment. Additional detail regarding identifying a diverse data segment is provided below (e.g., in relation to FIG. 5A).

Moreover, as illustrated in FIG. 2B, the diverse recommendation system 106 selects an anomalous item in an act 208. In particular, as shown in FIG. 2B, the diverse recommendation system 106 selects an anomalous item from items associated with user datapoints from the identified diverse data segment. In some embodiments, the diverse recommendation system 106 identifies one or more items associated with the diverse data segment (e.g., using item associations with user datapoints within the diverse data segment). Then, the diverse recommendation system 106 can determine user-preference scores for the one or more items to rank the one or more items. Subsequently, as shown in FIG. 2B, the diverse recommendation system 106 selects an anomalous item from the ranked items in the act 208. Additional detail regarding determining user-preference scores, ranking items, and selecting an anomalous item is provided below (e.g., in relation to FIGS. 5B and 5C).

As also shown in FIG. 2B, the diverse recommendation system 106 provides the anomalous item as an item recommendation in an act 210. In particular, the diverse recommendation system 106 can utilize the selected anomalous item to generate a diverse item recommendation. Then, as shown in FIG. 2B, the diverse recommendation system 106 can provide the diverse item recommendation for display within a graphical user interface of a client device (e.g., a product recommendation via an email). Additional detail regarding providing anomalous item selections as item recommendations is provided below (e.g., in relation to FIG. 6).

Figure 3:
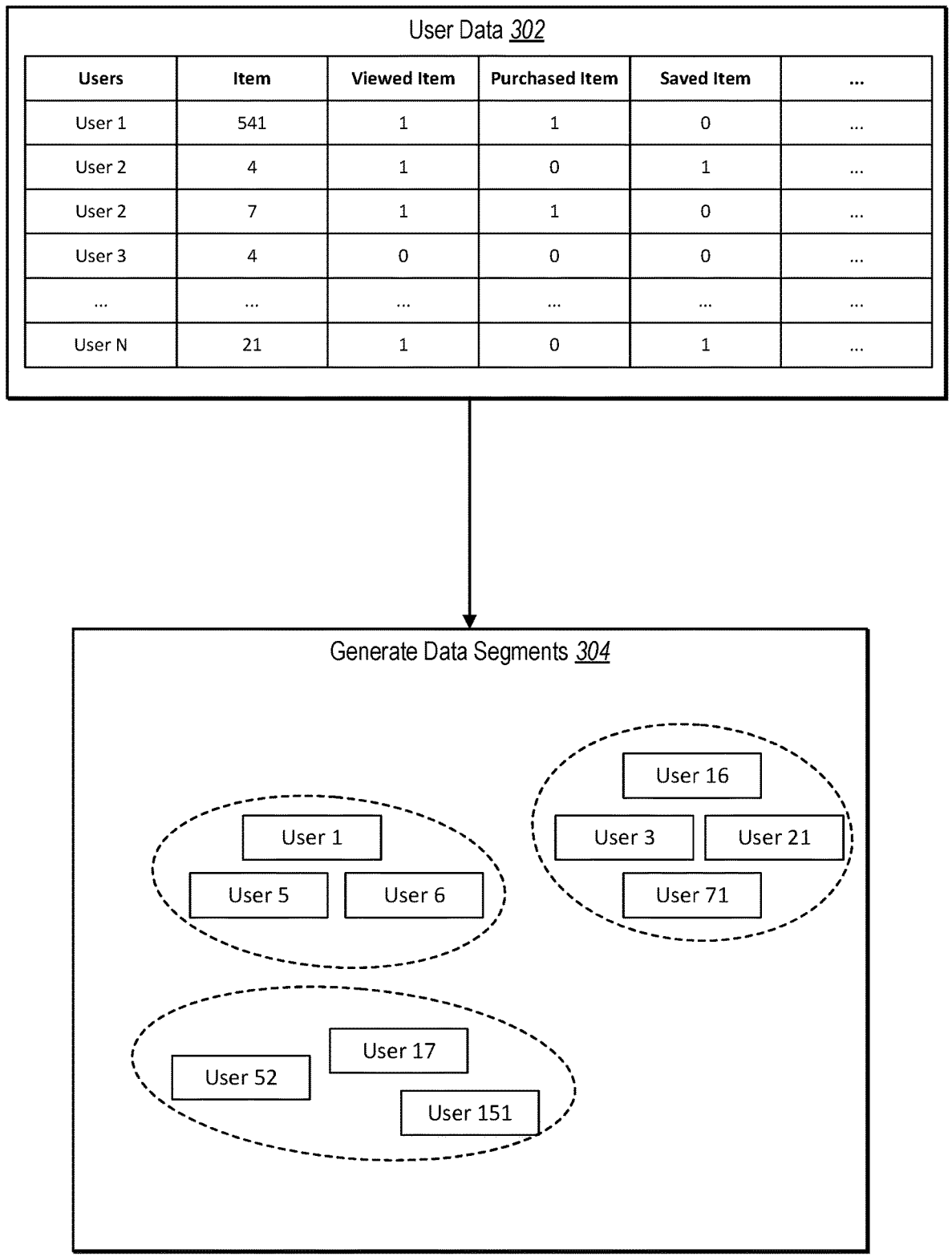
FIG. 3 illustrates a schematic diagram of a diverse recommendation system generating data segments in accordance with one or more embodiments.

As mentioned above, the diverse recommendation system 106 can generate a plurality of data segments that represent users clustered according to affinities for particular items. For example, FIG. 3 illustrates the diverse recommendation system 106 generating a plurality of data segments. Indeed, as shown in FIG. 3, the diverse recommendation system 106 can identify user data 302 for a plurality of users and those user's associations with items (from a dataset of items). As illustrated in FIG. 3, the user data 302 includes particular user's interactions with particular items from the dataset of items (e.g., views, purchases, saves). Subsequently, the diverse recommendation system 106 can utilize a clustering algorithm to analyze the user data to cluster users with similar affinities toward similar items in a multidimensional space. For instance, as shown in FIG. 3, the diverse recommendation system 106 can generate data segments in an act 304 by clustering user datapoints (including the user data) using a clustering algorithm and then determining data segments of user datapoints from those clusters.

In one or more embodiments, the diverse recommendation system 106 receives (or identifies) a dataset of users and a dataset of items from the administrator device 114. As an example, the item data can include item information for a platform. The diverse recommendation system 106 can receive (or obtain) the item information (as item data) and user data (e.g., information about users and interactions with items on the platform). For example, as illustrated in FIG. 3, the user data 302 indicates a variety of user interactions from users with items. As an illustration, the item data can include product information for an e-commerce website and the diverse recommendation system 106 can receive (or obtain) the product information (as item data) and user data (e.g., information about users and interactions with items on an e-commerce website).

Indeed, in one or more embodiments, the diverse recommendation system 106 can receive (or identify) item data and user data that is specific to a variety of platforms hosted by the administrator device 114. For example, for a news or magazine content provider, the items can include media-content, such as articles and/or categories of news. Moreover, the user data can include user interactions with particular articles and/or categories on the news or magazine content provider platform. Furthermore, in some embodiments, the diverse recommendation system 106 can receive (or identify) item data and user data for a video streaming provider. For instance, for the video streaming provider, the items can include media-content, such as videos, and the user data can include user interactions with particular videos on the video streaming provider platform.

Upon receiving (or identifying) user data (with item associations), the diverse recommendation system 106 can utilize the user data to generate data segments. In particular, the diverse recommendation system 106 can analyze the user data (e.g., items associated with each user, information about the users, interactions with items) to cluster datapoints representing users that have an affinity to similar items closer together in a multidimensional space. For example, the diverse recommendation system 106 can utilize a clustering algorithm with parameters for the various user data (and/or item data) to determine clusters of user datapoints with similarities. Indeed, the diverse recommendation system 106 can minimize distance in the multidimensional space between user datapoints that have a greater similarity (e.g., based on user behavior with items, user information, item associations) and increase distance between user datapoints that have lesser similarities. Then, the diverse recommendation system 106 can identify a cluster (or group) of user datapoints as a data segment.

For example, in one or more embodiments, the diverse recommendation system 106 can utilize Bayesian non-parametric clustering to cluster user datapoints to generate the data segments. For instance, by utilizing Bayesian non-parametric clustering, the diverse recommendation system 106 can utilize various combinations of user data and/or item data to determine user datapoint clusters (e.g., a non-parametric clustering approach can include an undefined or various numbers of dimensions). Furthermore, the diverse recommendation system 106 can utilize Bayesian non-parametric clustering to continuously obtain user data and/or item data to update user datapoint clusters and/or a number of existing clusters (e.g., as new items or users data is introduced, the diverse recommendation system 106 can generate new clusters). Indeed, the diverse recommendation system 106 can utilize Bayesian non-parametric clustering can generate (or learn) an undefined or various numbers of clusters to adapt to new user data and/or item data. Furthermore, the diverse recommendation system 106 can utilize a variety of clustering algorithm approaches as described above.

For instance, in some embodiments, the diverse recommendation system 106 can utilize a Bayesian non-parametric clustering approach, as described in Peter Orbanz and Yee Whye Teh, *Bayesian Nonparametric Models*, Encyclopedia of Machine Learning, https://www.stats.ox.ac.uk/~teh/research/npbayes/OrbTeh2010a.pdf (2010), which is hereby incorporated by reference in its entirety.

Furthermore, the clusters learned (or generated) by the diverse recommendation system 106 can represent affinities for particular items from a dataset of items. Indeed, the diverse recommendation system 106 can utilize the generated clusters to represent specific categories (e.g., a specific style of clothing, movie genres, news categories). Furthermore, the diverse recommendation system 106 can associate the users corresponding to user datapoints in a cluster corresponding to the specific category. Furthermore, the diverse recommendation system 106 can utilize a cluster of user datapoints as a data segment to generate a plurality of data segments for different clusters of user datapoints.

Although one or more embodiments herein describe the diverse recommendation system 106 clustering user datapoints to generate data segments, the diverse recommendation system 106 can cluster various combinations of available data to generate the data segments. For example, the diverse recommendation system 106 can determine clusters of one or both of user datapoints and item datapoints within a multidimensional space using a variety of clustering algorithms (as described above). In some embodiments, the diverse recommendation system 106 clusters items based on similarities of the items using a variety of clustering algorithms. Then, the diverse recommendation system 106 can determine users that are associated with the clustered items as the data segments.

Additionally, in some embodiments, the diverse recommendation system 106 can identify data segments from a third party. For instance, the diverse recommendation system 106 can identify (or receive) predetermined data segments from the administrator device 114 (e.g., an e-commerce web site host that generates data segments using information received by the e-commerce website). Indeed, the diverse recommendation system 106 can receive the predetermined data segments and utilize a diversification metric to select an anomalous item for a user after identifying a diverse data segment for the user from the received data segments.

As mentioned above, the diverse recommendation system 106 can receive a diversification metric. Indeed, in one or more embodiments, the diverse recommendation system 106 provides data corresponding to a customizable-recommendation-user interface for display on a client device of a user with selectable tools (or options) to enable easy and quick configuration of a degree of diversification in item recommendations for a user. For example, the diverse recommendation system 106 can provide a customizable-recommendation-user interface with selectable tools to receive a variety of metrics including a diversification metric, a frequency metric, and/or a time metric.

Figure 4A:
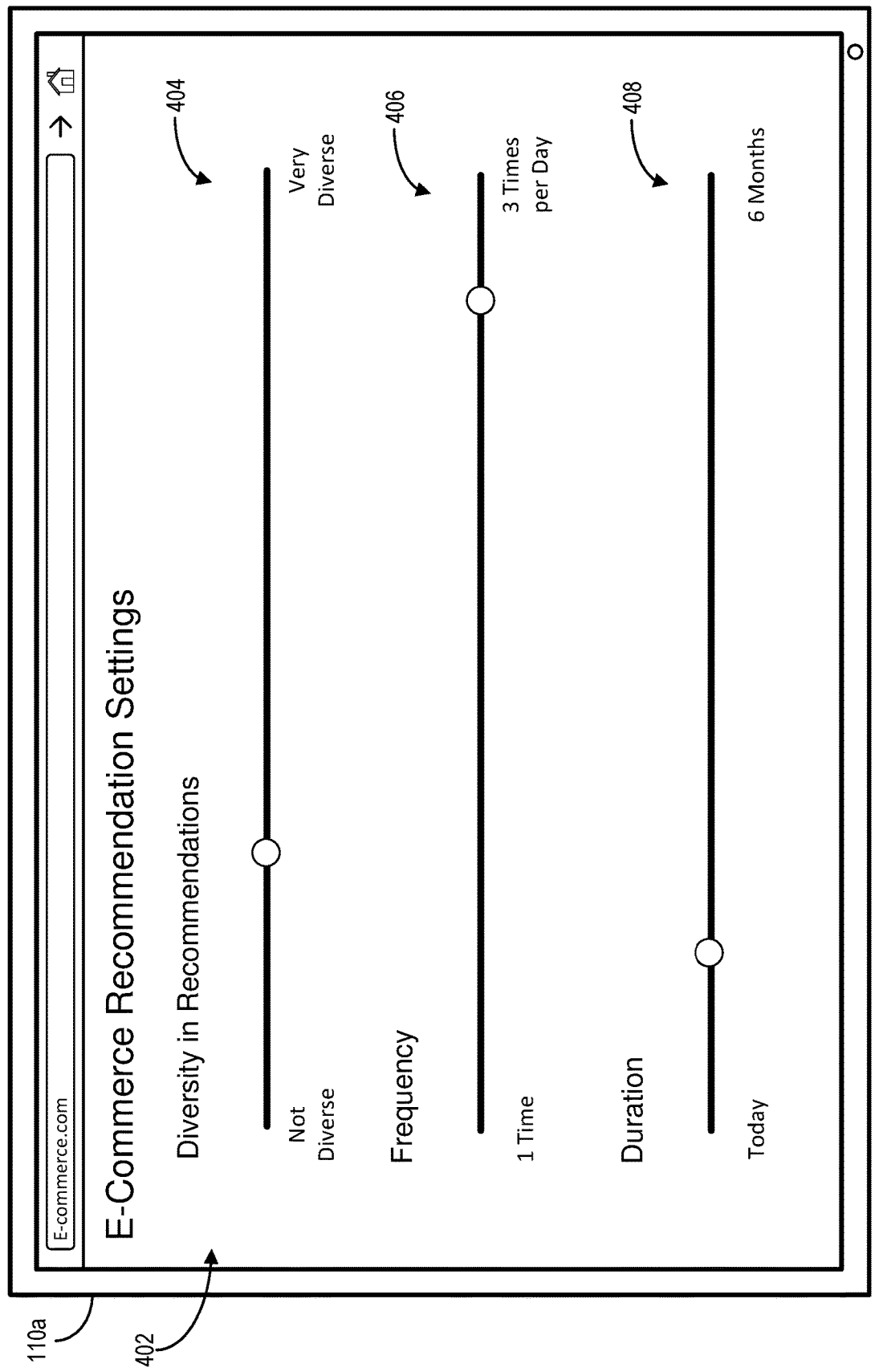
FIGS. 4A-4B illustrate example graphical user interfaces provided by a diverse recommendation system to receive a diversification metric in accordance with one or more embodiments.

For example, FIG. 4A illustrates a customizable-recommendation-user interface 402 generated by the diverse recommendation system 106 for display on the client device 110a. As shown in FIG. 4A, the diverse recommendation system 106 provides a selectable-diversification tool 404 within the customizable-recommendation-user interface 402 (for item-recommendation-preference settings). Indeed, as further illustrated in FIG. 4A, the diverse recommendation system 106 provides the selectable-diversification tool 404 as a slider tool. The diverse recommendation system 106 can receive from the client device 110a, via user interaction with the selectable-diversification tool 404, an indication of a position of the slider tool on the selectable-diversification tool 404 (e.g., between not diverse and very diverse). Furthermore, the position of the slider tool on the selectable-diversification tool 404 can correspond to a value for the diversification metric from a range of values. Indeed, the diverse recommendation system 106 can determine the selected value for the diversification metric using the position of the slider tool on the selectable-diversification tool 404.

In addition to the selectable-diversification tool 404 to select a diversification metric, the diverse recommendation system 106 can also provide a selectable-frequency tool 406 and a selectable-time tool 408 for display within the customizable-recommendation-user interface 402. For example, the diverse recommendation system 106 can receive, via user interaction with the selectable-frequency tool 406, an indication of a position of the slider tool on the selectable-frequency tool 406 (e.g., between one time and three times a day). Then, the diverse recommendation system 106 can determine a value for the frequency metric using the position of the slider tool on the selectable-frequency tool 406. Moreover, the diverse recommendation system 106 can receive, via user interaction with the selectable-time tool 408, an indication of a position of the slider tool on the selectable-time tool 408 (e.g., between one day and six months). Subsequently, the diverse recommendation system 106 can determine a value for the time metric using the position of the slider tool on the selectable-time tool 408. Indeed, the diverse recommendation system 106 can present a variety of values for the frequency metric and time metric via the customizable-recommendation-user interface 402.

Figure 4B:
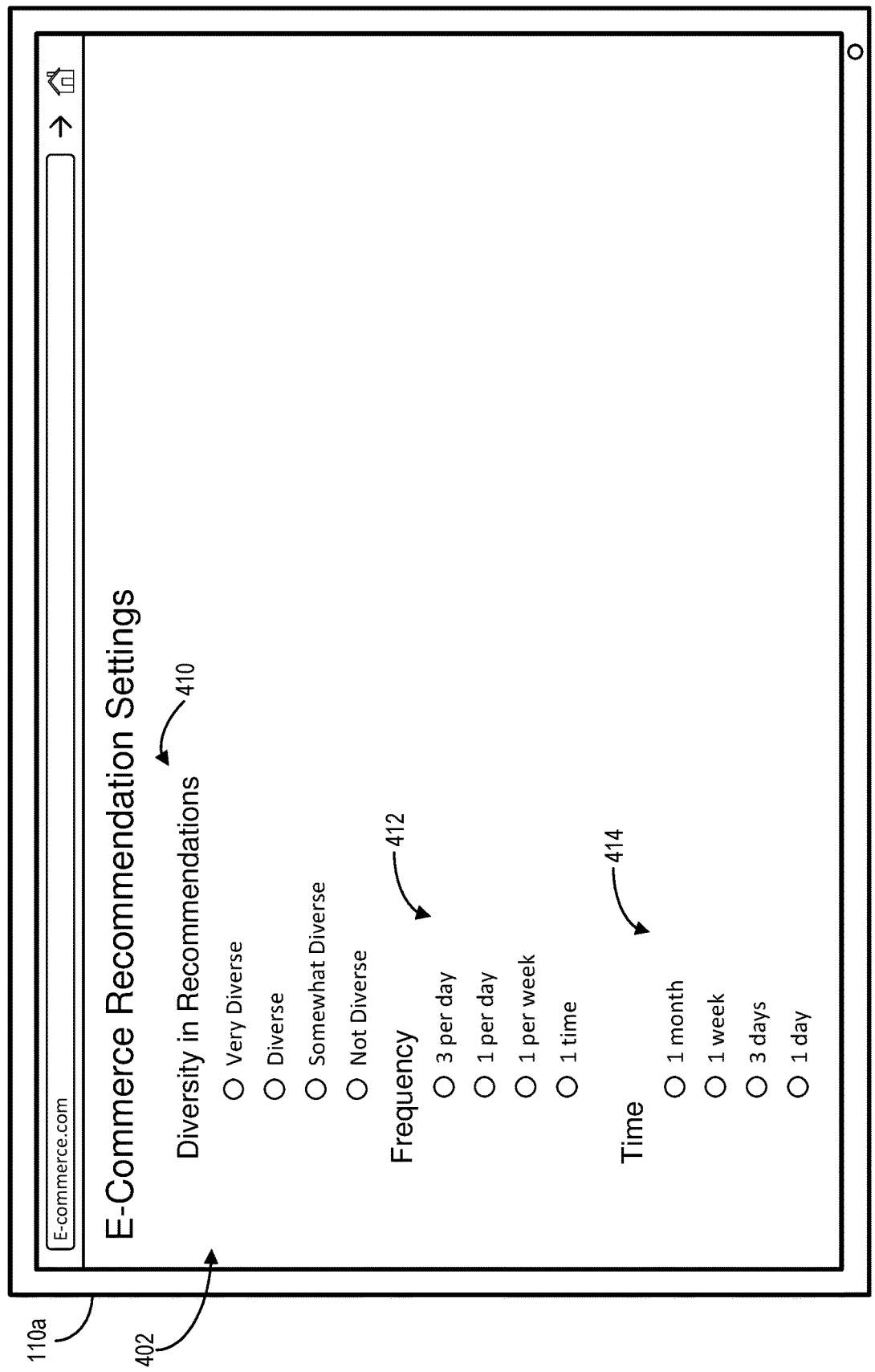

As another example, FIG. 4B illustrates the diverse recommendation system 106 providing a selectable-diversification tool 410 within the customizable-recommendation-user interface 402 (for item-recommendation-preference settings) on the client device 110a. Indeed, as illustrated in FIG. 4B, the diverse recommendation system 106 provides the selectable-diversification tool 410 as selectable tools (e.g., radio buttons) between varying degrees of diversification for item recommendations. The diverse recommendation system 106 can receive, via user interaction with the selectable-diversification tool 410, an indication of a selection of one of the options associated with the selectable-diversification tool 410 (e.g., very diverse, diverse, somewhat diverse, not diverse). Then, the diverse recommendation system 106 can determine a value for the diversification metric using the selected option from the selectable-diversification tool 410.

As shown in FIG. 4B, the diverse recommendation system 106 can also provide a selectable-frequency tool 412 and a selectable-time tool 414 for display within the customizable-recommendation-user interface 402. For example, the diverse recommendation system 106 can receive from the client device 110a, via user interaction with the selectable-frequency tool 412, an indication of a selection of one of the options associated with the selectable-frequency tool 412 (e.g., 3 per day, 1 per day, 1 per week, 1 time). Then, the diverse recommendation system 106 can determine a value for the frequency metric using the selected option from the selectable-frequency tool 412. Furthermore, the diverse recommendation system 106 can receive, via user interaction with the selectable-time tool 414, an indication of a selection of one of the options associated with the selectable-time tool 414 (e.g., 1 month, 1 week, 3 days, 1 day). Subsequently, the diverse recommendation system 106 can determine a value for the time metric using the selected option from the selectable-time tool 414.

The diverse recommendation system 106 can provide a variety of graphical user interface elements to receive a diversification metric (or another metric) from a user via a client device. For instance, the diverse recommendation system 106 can generate data for a graphical user interface with various combinations of slider tools, radio button elements, text input elements, selectable images, and/or other selectable elements to facilitate selection of a diversification metric (or another metric). Indeed, by doing so, the diverse recommendation system 106 can provide diverse item recommendations to users by simple selection of a diversification metric while using complex clustering algorithms to determine the item recommendations.

In some embodiments, the diverse recommendation system 106 can provide a graphical user interface with selectable-diversification tools (or other selectable-metric tools) for specific types of items or situations. For example, the diverse recommendation system 106 can provide a first selectable-diversification tool to select a first diversification metric for a first type of items and a second selectable-diversification tool to select a second diversification metric for a second type of items (e.g., to utilize a different degree of diversification for different types of items). As an example, in an e-commerce web site that includes various types of items (e.g., clothing, electronics, cooking products), the diverse recommendation system 106 can utilize a first diversification metric to select diverse item recommendations for clothing items and a second diversification metric to selective diverse item recommendations for electronics items on the e-commerce website.

Additionally, the diverse recommendation system 106 can utilize a selection of a user via a selectable-diversification tool on a graphical user interface to translate the selection into a value for the diversification metric. For instance, the diverse recommendation system 106 can provide a slider tool that ranges from no diversity to very diverse with a range of values from 0 through 10. Indeed, the diverse recommendation system 106 can utilize a value of 0 for a diversification metric when "no diversity" is selected by a user and a value of 10 for the diversification metric when "very diverse" is selected by the user. Subsequently, the diversification metric can be utilized to identify a diverse data segment and an anomalous item as described below.

Moreover, the diverse recommendation system 106 can utilize a selected frequency metric to indicate a frequency with which to provide a user with diverse item recommendations based on the diversification metric. For example, when a user selects a frequency metric of "once per week," the diverse recommendation system 106 can provide a diverse item recommendation (in accordance with one or more embodiments herein) once per week to the user. Likewise, when a user selects a frequency metric of "one time," the diverse recommendation system 106 can provide a diverse item recommendation once to the user. Indeed, the diverse recommendation system 106 can utilize a variety of frequencies for the frequency metric.

In some embodiments, the diverse recommendation system 106 can determine a frequency metric. For instance, the diverse recommendation system 106 can determine a frequency metric without user selection of a frequency metric (e.g., using a default frequency metric and/or a configured frequency metric provided by an administrator user). In one or more embodiments, the diverse recommendation system 106 determines a frequency metric using a selected diversification metric. For example, the diverse recommendation system 106 can increase and/or decrease a value associated with a frequency metric based on a value of the diversification metric (e.g., using a higher frequency metric as a higher diversification metric is selected). For instance, the diverse recommendation system 106 can utilize a frequency metric that is proportional to a selected diversification metric.

In addition, the diverse recommendation system 106 can utilize a selected time metric to indicate a time period in which to provide a user with diverse item recommendations based on the diversification metric. For instance, when a user selects a time metric of "1 week," the diverse recommendation system 106 can provide diverse item recommendations within specified the week (e.g., further based on the specified frequency). Likewise, when a user selects a time metric of "one day," the diverse recommendation system 106 can provide diverse item recommendations to the user for just the specified day. Indeed, the diverse recommendation system 106 can utilize a variety of time durations for the time metric. In addition, the diverse recommendation system 106 can provide, via a customizable-recommendation-user interface, a selectable tool (or option) for the diversification metric alone or with various combinations of selectable tools for a frequency metric or a time metric. Additionally, in some embodiments, the diverse recommendation system 106 determines a time metric utilizing a default time metric setting and/or a time metric that is proportional to a selected diversification metric.

Moreover, the diverse recommendation system 106 can provide a customizable-recommendation-user interface for selection of a diversification metric in various formats and/or locations. For instance, the diverse recommendation system 106 can provide the customizable-recommendation-user interface as an item-recommendation-preference settings page within a website and/or application. In some embodiments, the diverse recommendation system 106 can provide the customizable-recommendation-user interface for selection of a diversification metric alongside an item recommendation (e.g., a preference setting link displayed with an item recommendation as described in FIG. 6). Furthermore, the diverse recommendation system 106 can also provide a selectable tool for a diversification metric as a browser plugin (e.g., a diversification metric that is presented and selected for a specific website and/or for a variety of websites to provide diverse item recommendations in correspondence with the specific website and/or for the variety of websites).

Figure 5A:
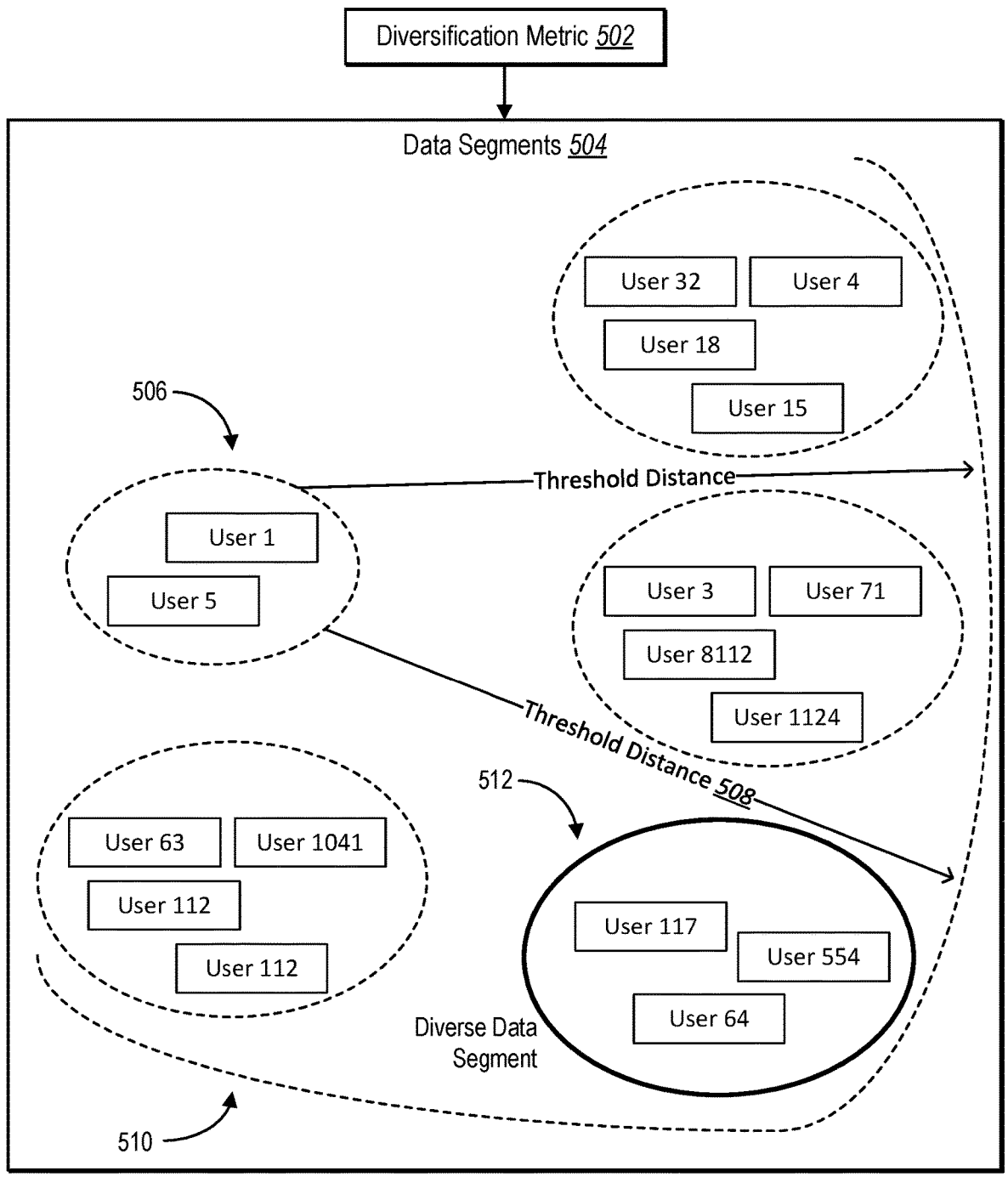
FIG. 5A illustrates a diverse recommendation system identifying a diverse data segment in accordance with one or more embodiments.

As mentioned above, the diverse recommendation system 106 can identify a diverse data segment. For example, as shown in FIG. 5A, the diverse recommendation system 106 can utilize the diversification metric 502 to determine a threshold distance 508 for a reference data segment within a multidimensional space that includes data segments 504. Furthermore, the diverse recommendation system 106 can identify a reference data segment 506 that includes a multidimensional datapoint representing the user that provided the diversification metric 502 (e.g., user 1). Subsequently, as shown in FIG. 5A, the diverse recommendation system 106 can determine a proximity 510, from the reference data segment 506, within the multidimensional space of the data segments 504 using the threshold distance 508. Within the proximity 510, the diverse recommendation system 106 can select a neighboring data segment as the diverse data segment (e.g., diverse data segment 512).

In one or more embodiments, the diverse recommendation system 106 determines a threshold distance to utilize in identifying a diverse data segment based on the diversification metric. For instance, the diverse recommendation system 106 can utilize the value corresponding to the diversification metric as a threshold distance (e.g., a one-to-one translation of the value or proportional translation of the value). In some embodiments, the diverse recommendation system 106 can utilize a diversification metric as a modifier or multiplier for a threshold distance. For instance, the diverse recommendation system 106 can multiply a predetermined threshold distance (e.g., set by the administrator device 114) by a value corresponding to the diversification metric. In some embodiments, the diverse recommendation system 106 adds a value corresponding to the diversification metric to the predetermined threshold distance.

Furthermore, within a multidimensional space that includes the data segments (e.g., user datapoint clusters corresponding to the data segments), the diverse recommendation system 106 can determine distances between one or more data segments. For example, the diverse recommendation system 106 can utilize a variety of approaches to determine distances between one or more data segments. For instance, the diverse recommendation system 106 can utilize approaches such as, but not limited to, cosine similarities, L2distance, Jaccard similarities, or Euclidean distances to determine distances between one or more data segments. Additionally, the diverse recommendation system 106 can determine (or measure) distances between various combinations of center points, edges, datapoints of data segments (e.g., center-to-center, edge-to-edge, center-to-edge, center-to-datapoint). In addition, the diverse recommendation system 106 can determine a minimal and/or maximum distance between data segments.

As an example, the diverse recommendation system 106 can determine a center point for a reference data segment. Subsequently, the diverse recommendation system 106 can identify a center point for a neighboring data segment. In some embodiments, the diverse recommendation system 106 determines a distance value between the center points of the reference data segment and the diverse data segment (e.g., by measuring a cosine similarity between the center points). Moreover, in one or more embodiments, the diverse recommendation system 106 can utilize a maximum distance between data segments by determining a greatest distance value between a center point of a reference data segment and any given point associated with a neighboring data segment (e.g., a furthest edge of the neighboring data segment).

Additionally, the diverse recommendation system 106 can identify a reference data segment from a plurality of data segments represented in a multidimensional space. For example, the diverse recommendation system 106 can identify user datapoint within the multidimensional space that corresponds to the user associated with the diversification metric (e.g., the target user). Then, the diverse recommendation system 106 can identify the data segment that includes the user datapoint as the reference data segment.

Upon identifying the reference data segment, the diverse recommendation system 106 can identify a diverse data segment from among a plurality of data segments represented in the multidimensional space. For instance, the diverse recommendation system 106 can determine a proximity within the multidimensional space utilizing the threshold distance (as indicated by the diversification metric). Subsequently, the diverse recommendation system 106 can identify neighboring data segments (e.g., a plurality of neighboring data segments) that are within the determined proximity (e.g., different clusters) in the multidimensional space.

From the neighboring data segments, in some embodiments, the diverse recommendation system 106 selects a data segment having the greatest distance from the reference data segment as the diverse data segment. Indeed, the diverse recommendation system 106 can select a diverse data segment that is furthest in distance from the reference data segment, in the multidimensional space, while still being within the threshold distance. By doing so, the diverse recommendation system 106 selects the most diverse data segment (relative to the reference data segment) within the threshold distance.

In some embodiments, the diverse recommendation system 106 can select a data segment from among the neighboring data segments based on a variety of other attributes and/or characteristics of the neighboring data segments. For example, the diverse recommendation system 106 can select a data segment from among the neighboring data segments based on a number of user interactions corresponding to the neighboring data segments (e.g., as an indication of popularity of the data segment). For instance, the diverse recommendation system 106 can determine a number of user interactions with items (or on a platform hosting the items) from users corresponding to the user datapoints from the data segments. Moreover, the diverse recommendation system 106 can utilize the number of user interactions to determine which data segment, from the neighboring data segments, is associated with the most user interactions and select that data segment as the diverse data segment.

Additionally, in one or more embodiments, the diverse recommendation system 106 can select a data segment from among the neighboring data segments based on sizes corresponding to the neighboring data segments. For instance, the diverse recommendation system 106 can determine a number of user datapoints associated with each neighboring data segment. Then, the diverse recommendation system 106 can identify the data segment having the highest number of user datapoints as the largest data segment from the neighboring data segments. Indeed, in some embodiments, the diverse recommendation system 106 selects the largest data segment from the neighboring data segments as the diverse data segment.

Furthermore, in some embodiments, the diverse recommendation system 106 selects user datapoints from the reference data segment as the diverse data segment. In particular, the diverse recommendation system 106 can determine that a threshold distance as indicated by a diversification metric is within the bounds of the reference data segment (e.g., the threshold distance from the center point of the reference data segment is still within the bounds of the reference data segment). Upon determining that the threshold distance is within the bounds of the reference data segment, the diverse recommendation system 106 can select user datapoints within the reference data segment to create a diverse data segment.

More specifically, in some embodiments, the diverse recommendation system 106 selects a threshold number of user datapoints that are furthest from the center point of the reference data segment while still within the threshold distance to create a diverse data segment to utilize in diverse item recommendations. In one or more embodiments, the diverse recommendation system 106 can select user datapoints that are within the reference data segment and outside of the threshold distance from the center point of the reference data segment to create a diverse data segment to utilize in diverse item recommendations. Indeed, by doing so, the diverse recommendation system 106 can identify items that are associated with users that correspond to user datapoints further from the center of the reference data segment (e.g., more diverse than user datapoints of users that are near the center of the reference data segment).

Figure 5B:
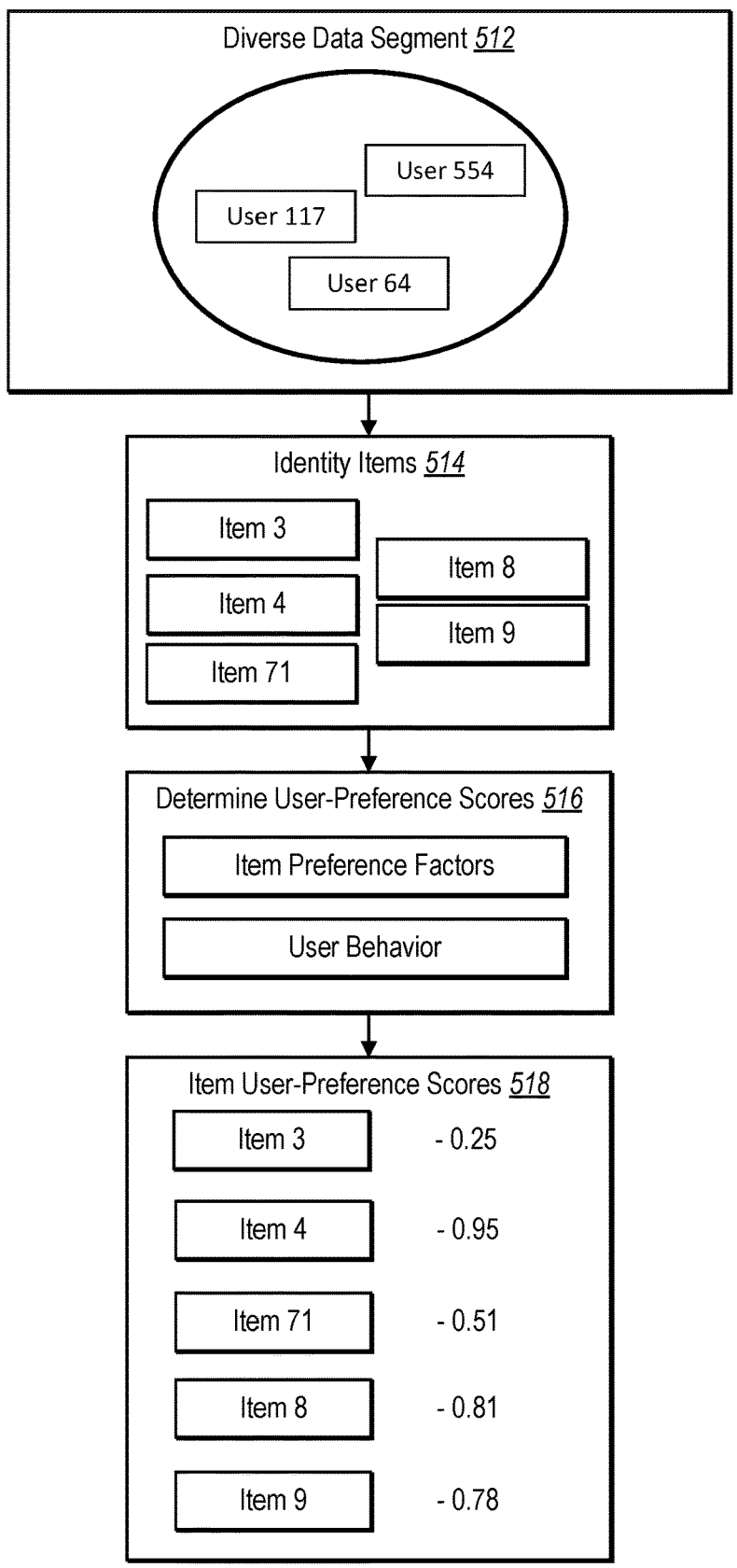
FIGS. 5B and 5C illustrate a diverse recommendation system selecting an anomalous item from a diverse data segment in accordance with one or more embodiments.

As mentioned above, the diverse recommendation system 106 can identify one or more items associated with a diverse data segment and determine user-preference scores for the one or more items. For instance, FIG. 5B illustrates the diverse recommendation system 106 identifying items associated with a diverse data segment and determining user-preference scores for those items. In particular, as shown in FIG. 5B, the diverse data segment 512 can includes user datapoints. The diverse recommendation system 106 can, in an act 514, identify items (e.g., Items 3, 4, 71, 8, 9) associated with user datapoints from the diverse data segment 512. In particular, the diverse recommendation system 106 can identify items that are associated with the user datapoints from the diverse data segment 512. Then, the diverse recommendation system 106 can utilize item preference factors and user behavior to determine user-preference scores in an act 516. Indeed, the diverse recommendation system 106 can determine user-preference scores in the act 516 to result in the user-preference scores 518 (e.g., a list of items with corresponding user-preference scores that indicate higher affinity to an item for a user based on a higher score value).

In one or more embodiments, the diverse recommendation system 106 identifies items associated with a diverse data segment by utilizing user interactions. In particular, the diverse recommendation system 106 can identify user interactions with one or more items for each user datapoint in the diverse data segment. Then, the diverse recommendation system 106 identifies the one or more items with user interactions from the user datapoints in the diverse data segment as items associated with the diverse data segment. For example, the user interactions can include views, clicks, or purchases of items from user datapoints from the diverse data segment.

Upon identifying items associated with the diverse data segment, the diverse recommendation system 106 can determine user-preference scores for the identified items. As mentioned above, a user-preference score can indicate a preference and/or relevance for a of an item for a user. In particular, the diverse recommendation system 106 can determine user-preference scores for items associated with user datapoints from the diverse data segment to select an anomalous item for recommendation to the user (e.g., the target user associated with the diversification metric).

In one or more embodiments, the diverse recommendation system 106 determines a user-preference score for an item by utilizing item preference factors that correspond to the item. In particular, the diverse recommendation system 106 can determine scores for a variety of item preference factors (e.g., characteristics and/or attributes corresponding to the item). For example, the diverse recommendation system 106 can determine a number of interactions (or clicks) that are associated with the item and assign a first value to the item based on the number of interactions. Moreover, the diverse recommendation system 106 can determine a number of purchases associated with the item and assign a second value to the item based on the number of purchases.

Then, the diverse recommendation system 106 can combine the values assigned to the item (each based on different factors of the item) to determine the user-preference score for the item. For instance, the diverse recommendation system 106 can add the values corresponding to the item preference factors to determine the user-preference score. Indeed, the diverse recommendation system 106 can utilize a variety of factors (e.g., characteristics and/or attributes) of an item to determine a user-preference score. By doing so, in some embodiments, the diverse recommendation system 106 determines a high user-preference score for popular items within the diverse data segment (e.g., popularity due to factors such as higher number of interactions, purchases, reviews).

In some embodiments, the diverse recommendation system 106 determines a user-preference score for an item by utilizing a single item preference factor of an item. In particular, the diverse recommendation system 106 can utilize a count of user interactions associated with an item. For instance, the diverse recommendation system 106 can determine a number of purchases associated with an item and utilize the number of purchases as the user-preference score for the item.

Furthermore, in some embodiments, the diverse recommendation system 106 determines user-preference scores utilizing weights based on user behavior (e.g., using a dataset reflecting user behavior of the target user). In particular, the diverse recommendation system 106 can utilize user behavior data (e.g., user interactions in relation to a set of items and/or an entity associated with the set of items) to apply weights to specific item preference factors of an item when determining a user-preference score for an item. Indeed, the diverse recommendation system 106 can identify user behaviors of a user from user data in a dataset of users (or a portion of a dataset of users). Moreover, in some embodiments, the diverse recommendation system 106 can utilize user behavior data to weight specific item preference factors that are associated with user interactions that are similar to the user behavior data.

For example, for a user having a user behavior that indicates that the user is a frequent shopper, the diverse recommendation system 106 can apply a higher weight to item preference factors, such as views associated with the items when determining user-preference scores. As another example, for a user having a user behavior that indicates that the user is not a frequent shopper, the diverse recommendation system 106 can apply a higher weight to a number of purchases (e.g., popularity) and pricing associated with the items when determining user-preference scores. By doing so, the diverse recommendation system 106 can determine user-preference scores for items such that diverse item recommendations are more relevant for the target user.

To illustrate, the diverse recommendation system 106 can identify a number of purchases and an available quantity of an item as item preference factors for the item. Furthermore, the diverse recommendation system 106 can assign a value of 0.5 to the item preference factor of number of purchases due to a high number of purchases associated with the item. Additionally, the diverse recommendation system 106 can assign a value of 0.1 to the item preference factor of available quantity of the item due to a low quantity associated with the item. The diverse recommendation system 106 can further determine that, from user behavior data, the user is not frequently active on the platform where the items are sold (e.g., a non-frequent shopper) and consequently apply a weight of 1.5 to the item preference factor of number of purchases. Indeed, the diverse recommendation system 106 can update the value of 0.5 associated to the item preference factor of number of purchases to be 0.75. Using the updated item preference factors, the diverse recommendation system 106 can determine a user-preference score of 0.85 (out of 1.0) for the item.

Although one or more embodiments herein illustrate user-preference scores as number values between 0 and 1, the diverse recommendation system 106 can utilize a variety of numerical values and/or scoring formats to assign user-preference scores to items. For instance, the diverse recommendation system 106 can utilize, but is not limited to, user-preference scores between 0 and 100 and/or 0 and 10. The diverse recommendation system 106 can also assign a variety of labels and/or classifications as user-preference scores based on a determined value from the item preference factors (e.g., a grade and/or level).

As mentioned above, the diverse recommendation system 106 can select an anomalous item for recommendation to a user from items associated with user datapoints from a diverse data segment. In particular, in one or more embodiments, the diverse recommendation system 106 utilizes user-preference scores corresponding to items to rank items and select an anomalous item from the ranked items. Indeed, the diverse recommendation system 106 can rank items utilizing user-preference scores (e.g., from a highest user-preference score to a lowest user-preference score) and select the highest ranked item as the anomalous item for recommendation.

Figure 5C:
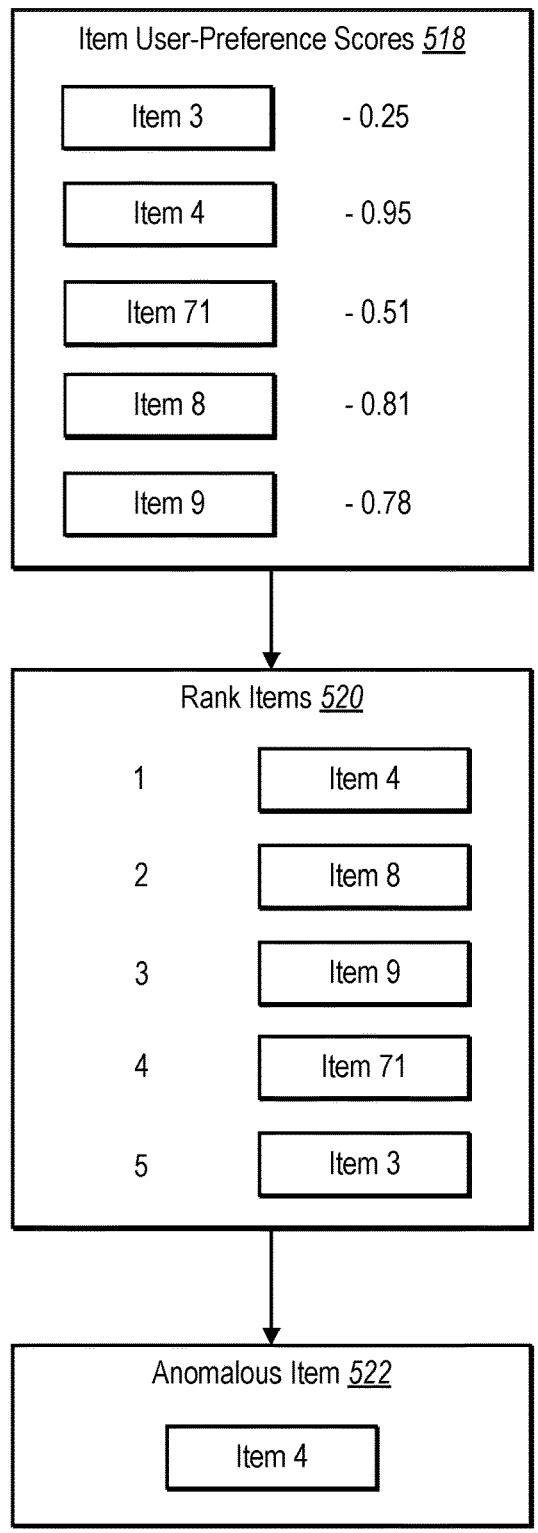

For instance, FIG. 5C illustrates the diverse recommendation system 106 ranking items and selecting an anomalous item from items associated with user datapoints from a diverse data segment. As shown in FIG. 5C, the diverse recommendation system 106 ranks items in an act 520 based on the user-preference scores 518. Indeed, as illustrated in FIG. 5C, the diverse recommendation system 106 ranks the items (in the act 520) from a highest user-preference score to a lowest user-preference score to determine ranked items associated with user datapoints from the diverse data segment 512 (e.g., from FIG. 5B). Subsequently, as shown in FIG. 5C, the diverse recommendation system 106 selects the top item (e.g., "Item 4") from the ranked items (from the act 520) as the anomalous item 522.

Although one or more embodiments herein describe the diverse recommendation system 106 selecting a single item, the diverse recommendation system 106 can select a various numbers of items as anomalous items for recommendation to a user. For instance, upon ranking items associated with user datapoints from a diverse data segment, the diverse recommendation system 106 can select the top two items (or another threshold number of items) as anomalous items. Indeed, the diverse recommendation system 106 can utilize a threshold number of items provided by the administrator device 114.

In addition, the diverse recommendation system 106 can select anomalous items for recommendation to a user based on various combinations of values from a received frequency metric and/or time metric. In particular, the diverse recommendation system 106 can select subsequent anomalous items as item recommendations based on a specified frequency metric and/or time metric. For instance, for a frequency metric of three times a week, the diverse recommendation system 106 can select an anomalous item as an item recommendation and also select subsequent anomalous items to satisfy the frequency metric preference (e.g., three times a week results in three anomalous item selections per week).

In one or more embodiments, the diverse recommendation system 106 selects subsequent anomalous items associated with user datapoints from the same diverse data segment. For instance, the diverse recommendation system 106 can iteratively select the next item from ranked items as the subsequent anomalous item. Indeed, the diverse recommendation system 106 can continuously select items according to their rank for subsequent anomalous item selections to satisfy a frequency metric preference (e.g., selecting an item ranked second followed by selecting an item ranked third).

In some embodiments, the diverse recommendation system 106 identifies a different diverse data segment for subsequent anomalous item selections. For instance, for subsequent anomalous item recommendations, the diverse recommendation system 106 can identify (or select) another diverse data segment (e.g., different from the diverse data segment used for the first anomalous item recommendation). Indeed, the diverse recommendation system 106 can identify the next furthest data segment, from among neighboring data segments, that is within the threshold distance, a data segment that is next largest in size from neighboring data segments, and/or the second most popular from the neighboring data segments. Then, the diverse recommendation system 106 can select an anomalous item from the newly identified diverse data segment (in accordance with one or more embodiments herein) to satisfy a frequency metric preference.

As mentioned above, the diverse recommendation system 106 can provide an anomalous item as a diverse item recommendation for display on a client device. For instance, the diverse recommendation system 106 can utilize a selected anomalous item to generate a diverse item recommendation. Then, the diverse recommendation system 106 can provide the item recommendation for display on a client device corresponding to a target user (e.g., the user that provided the diversification metric).

Figure 6:
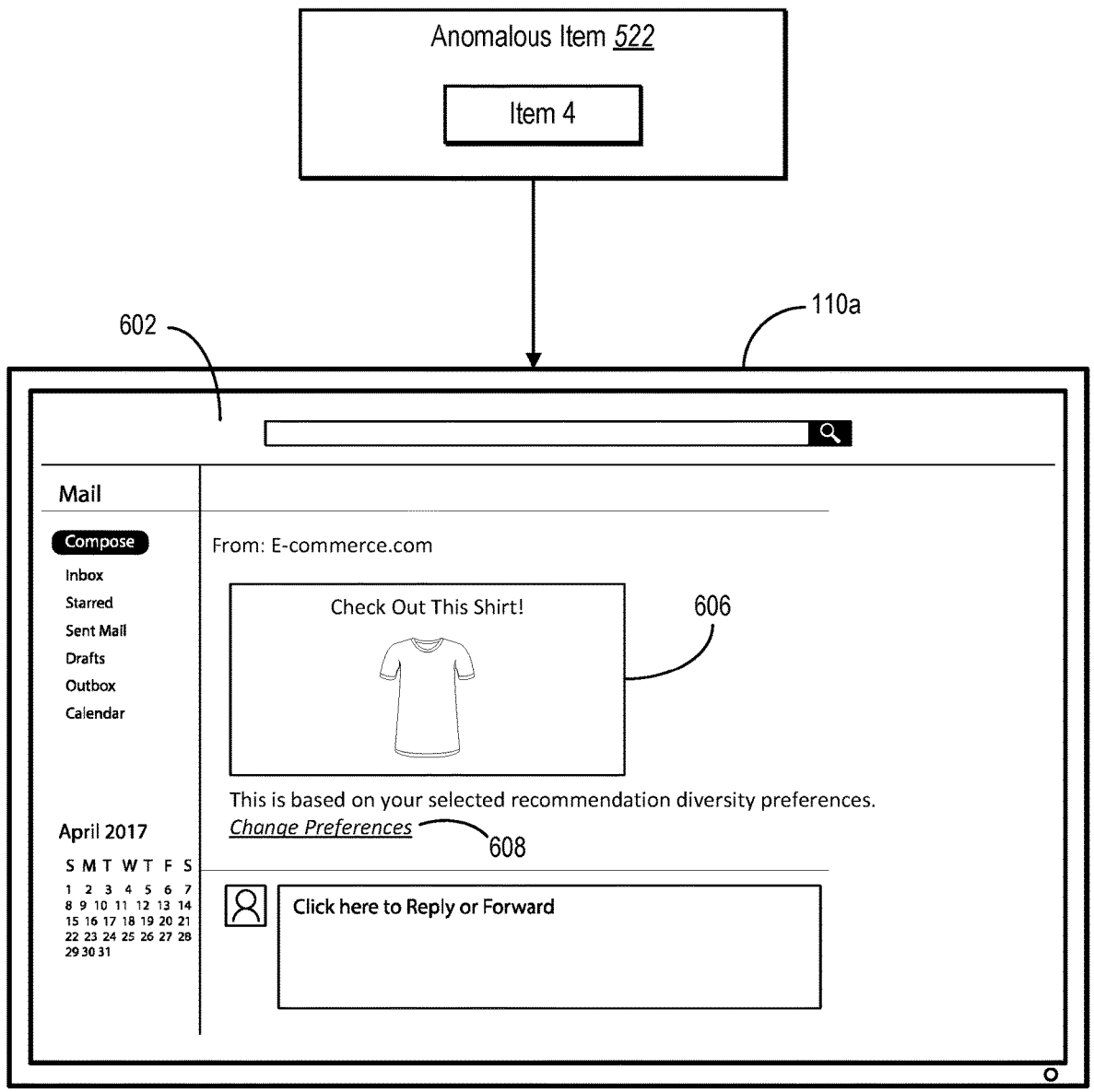
FIG. 6 illustrates a diverse recommendation system providing an anomalous item as an item recommendation in accordance with one or more embodiments.

For example, FIG. 6 illustrates the diverse recommendation system 106 providing an anomalous item as a diverse item recommendation for display on a client device. Indeed, as shown on FIG. 6, the diverse recommendation system 106 provides an indication of the anomalous item 522 (e.g., "Item 4" as selected in FIG. 5C) to the client device 110a. Subsequently, as shown in FIG. 6, client device 110a displays the diverse item recommendation 606 (e.g., a product recommendation for a clothing item associated with the anomalous item "Item 4") to a user in the graphical user interface 602 (e.g., an email user interface).

Although FIG. 6 illustrates the diverse recommendation system 106 providing the diverse item recommendation 606 as an email message, the diverse recommendation system 106 can provide an anomalous item as an item recommendation in a variety of formats. For instance, the diverse recommendation system 106 can provide an item recommendation within, but not limited to, an advertisement banner, a popup, within a specified section of a website and/or application, and/or via other communication formats (e.g., text, chat box, phone call).

Additionally, in some embodiments, the diverse recommendation system 106 can provide an identifier associated with the selected anomalous item to the administrator device 114 to enable an administrator (or the administrator device application 116) to populate an item recommendation format with the anomalous item associated with the provided identifier. Then, the administrator device 114 can provide the item recommendation of the anomalous item for display to a client device in the item recommendation format.

Moreover, the diverse recommendation system 106 can also provide a selectable graphical user element to enable access to a customizable-recommendation-user interface for item-recommendation-preference settings (e.g., to select a diversification metric, frequency metric, time metric) on a client device. For example, as shown in FIG. 6, the diverse recommendation system 106 provides a selectable element 608 (e.g., a link to "Change Preferences") for display within the graphical user interface 602. Upon receiving an indication of the selectable element 608, the diverse recommendation system 106 can cause the client device 110a to display a customizable-recommendation-user interface for item-recommendation-preference settings.

In addition, the diverse recommendation system 106 can also provide information related to the anomalous item recommendation for display on a client device. For instance, the diverse recommendation system 106 can provide the diversification metric value utilized to select the anomalous item for display with an item recommendation of the anomalous item on a client device. In addition, the diverse recommendation system 106 can provide a user-preference score for the anomalous item for display with the item recommendation of the anomalous item on a client device. In some embodiments, the information related to the anomalous item recommendation for display can be a non-numerical indicator (e.g., a color, text, a visual gauge) to represent a degree of diversification between the anomalous item and previously recommended items to the user. Indeed, the diverse recommendation system 106 can provide the diversification metric and/or user-preference score for display to describe the degree to which the recommended item is similar to or diverse from items that were previously recommended to a user.

The diverse recommendation system 106 can determine diverse recommendations in accordance with one or more embodiments herein for a variety of platforms. As an example, the diverse recommendation system 106 can determine diverse recommendations for an e-commerce platform. In particular, the diverse recommendation system 106 can generate data segments from user data (e.g., customers of the e-commerce platform) and item data (e.g., products from the e-commerce platform). Additionally, the diverse recommendation system 106 can utilize a diversification metric provided by a customer to identify a diverse data segment and an anomalous product for the customer as a diverse product recommendation in accordance with one or more embodiments herein.

Furthermore, in some embodiments, the diverse recommendation system 106 determines diverse recommendations for a news article platform. More specifically, the diverse recommendation system 106 can generate data segments from user data (e.g., subscribers and/or article viewers) and item data (e.g., articles and/or news categories). Then, the diverse recommendation system 106 can utilize a diversification metric provided by a viewer to identify a diverse data segment and an anomalous article/category for the viewer as a diverse article/category recommendation in accordance with one or more embodiments herein.

Moreover, in certain implementations, the diverse recommendation system 106 determines diverse recommendations for a video streaming platform. In particular, the diverse recommendation system 106 can generate data segments from user data (e.g., viewers) and item data (e.g., videos and/or genres). Subsequently, the diverse recommendation system 106 can utilize a diversification metric provided by a viewer of the video stream platform to identify a diverse data segment and an anomalous video stream/genre for the viewer as a diverse video stream/genre recommendation in accordance with one or more embodiments herein.

Figure 7:
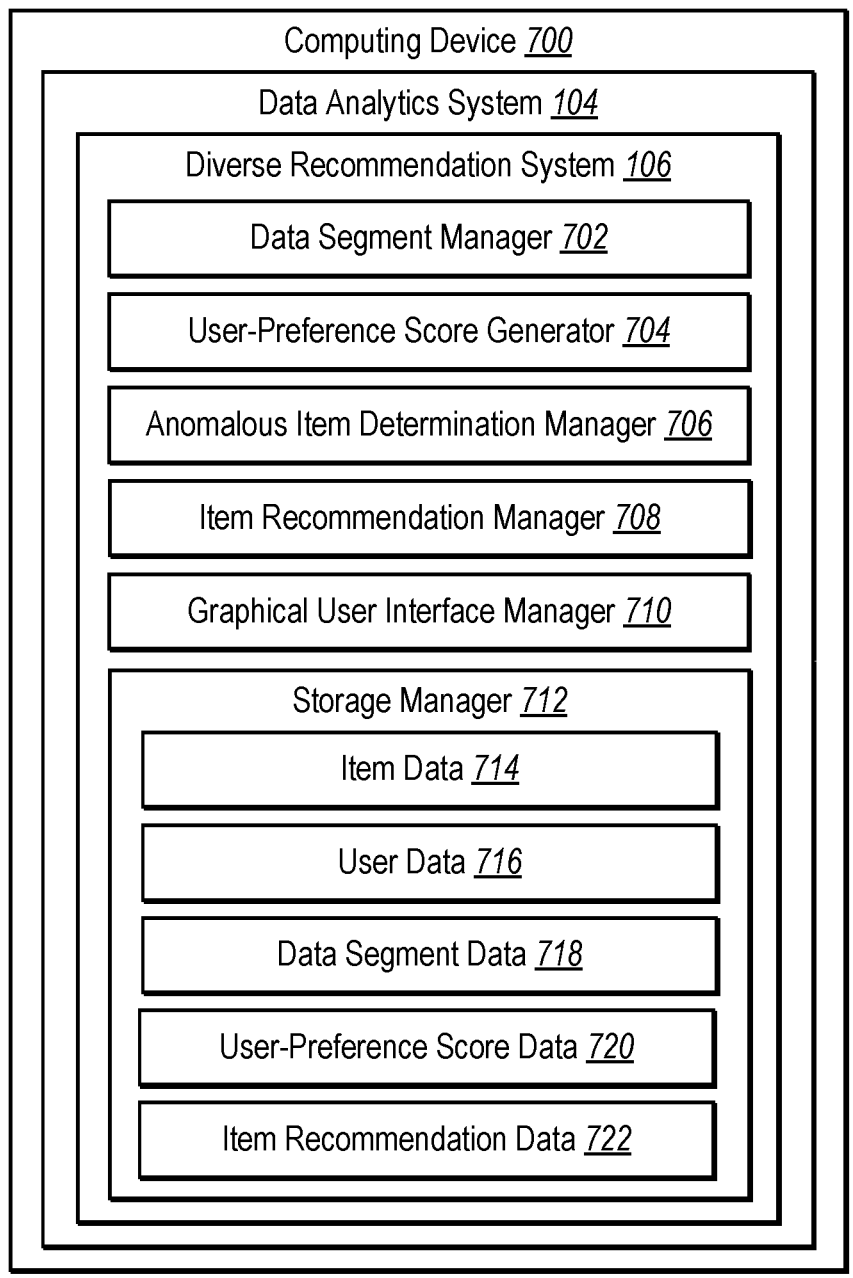
FIG. 7 illustrates a schematic diagram of a diverse recommendation system in accordance with one or more embodiments.

Turning now to FIG. 7, additional detail will be provided regarding components and capabilities of one or more embodiments of the diverse recommendation system. In particular, FIG. 7 illustrates an embodiment of an example diverse recommendation system 106 executed by a computing device 700 (e.g., the server device(s) 102 and/or the administrator devices 114). As shown by the embodiment in FIG. 7, the computing device 700 can include or host the data analytics system 104 and the diverse recommendation system 106. The diverse recommendation system 106 can include a data segment manager 702, a user-preference score generator 704, an anomalous item determination manager 706, an item recommendation manager 708, a graphical user interface manager 710, and a storage manager 712 which can include item data 714, user data 716, data segment data 718, user-preference score data 720, and item recommendation data 722.

As just mentioned, and as illustrated in the embodiment in FIG. 7, the diverse recommendation system 106 can include the data segment manager 702. For instance, the data segment manager 702 can utilize user data and/or item data to generate one or more data segments as described above (e.g., in relation to FIG. 3). Furthermore, the data segment manager 702 can generate the one or more data segments to represent particular users clustered according to affinities for particular items as described above (e.g., in relation to FIG. 3). Moreover, the data segment manager 702 can determine a diverse data segment using a threshold distance as indicated by a diversification metric as described above (e.g., in relation to FIG. 5A).

Additionally, as shown in FIG. 7, the diverse recommendation system 106 can include the user-preference score generator 704. For instance, the user-preference score generator 704 can identify items associated with user datapoints from a diverse data segment as described above (e.g., in relation to FIG. 5B). In addition, the user-preference score generator 704 can generate user preference scores for items using item preference factors and/or weights as described above (e.g., in relation to FIG. 5B).

Moreover, as shown in FIG. 7, the diverse recommendation system 106 can include the anomalous item determination manager 706. For example, the anomalous item determination manager 706 can rank items associated with user datapoints from a diverse data segment as described above (e.g., in relation to FIG. 5C). Additionally, the anomalous item determination manager 706 can select an anomalous item from ranked items as described above (e.g., in relation to FIG. 5C).

Furthermore, as shown in FIG. 7, the diverse recommendation system 106 can include the item recommendation manager 708. For instance, the item recommendation manager 708 can utilize a selected anomalous item to generate an item recommendation as described above (e.g., in relation to FIG. 6). Moreover, the item recommendation manager 708 can provide the anomalous item as the item recommendation for display on a client device as described above (e.g., in relation to FIG. 6).

In addition, as shown in FIG. 7, the diverse recommendation system 106 can include the graphical user interface manager 710. For example, the graphical user interface manager 710 can generate and/or provide customizable-recommendation-user interfaces to select diversification metrics (and/or other metrics) as described above (e.g., in relation to FIGS. 4A and 4B). In addition, the graphical user interface manager 710 can also generate and/or provide graphical user interfaces to display diverse item recommendations as described above (e.g., in relation to FIG. 6).

Additionally, as shown in FIG. 7, the diverse recommendation system 106 can include the storage manager 712. In some embodiments, the storage manager 712 can be implemented by one or more memory devices. The storage manager 712 can maintain data to perform one or more functions of the diverse recommendation system 106. As shown in FIG. 7, the storage manager 712 can include the item data 714 (e.g., information corresponding to products and/or media-content items, item preference factors), the user data 716 (e.g., demographic data, client device data, user behavior data), the data segment data 718 (e.g., clustering algorithms, clusters, data segments, distances, multi-dimensional representations of datapoints, diversification factors), the user-preference score data 720 (e.g., item preference factor values, weights, user-preference scores), and item recommendation data 722 (e.g., selected anomalous items, recommendation formats, item recommendations, frequency metrics, time metrics).

Each of the components 702-722 of the computing device 700 (e.g., the computing device 700 implementing the diverse recommendation system 106), as shown in FIG. 7, may be in communication with one another using any suitable communication technologies. It will be recognized that although components 702-722 of the computing device 700 (or computer device) are shown to be separate in FIG. 7, any of components 702-722 may be combined into fewer components, such as into a single facility or module, divided into more components, or configured into different components as may serve a particular embodiment.

The components 702-722 of the computing device 900 can comprise software, hardware, or both. For example, the components 702-722 can comprise one or more instructions stored on a computer-readable storage medium and executable by processor of one or more computing devices. When executed by the one or more processors, the computer-executable instructions of the diverse recommendation system 106 (e.g., via the computing device 700) can cause a client device and/or server device to perform the methods described herein. Alternatively, the components 702-722 and their corresponding elements can comprise hardware, such as a special purpose processing device to perform a certain function or group of functions. Additionally, the components 702-722 can comprise a combination of computer-executable instructions and hardware.

Furthermore, the components 702-722 of the diverse recommendation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-722 may be implemented as a stand-alone application, such as a desktop or mobile application. Furthermore, the components 702-722 may be implemented as one or more web-based applications hosted on a remote server. The components 702-722 may also be implemented in a suite of mobile device applications or "apps." To illustrate, the components 702-722 may be implemented in an application, including but not limited to, ADOBE EXPERIENCE PLATFORM, ADOBE ANALYTICS CLOUD, ADOBE ANALYTICS, ADOBE AUDIENCE MANAGER, ADOBE CAMPAIGN, and ADOBE TARGET. "ADOBE," "ADOBE EXPERIENCE PLATFORM," "ADOBE ANALYTICS CLOUD," "ADOBE ANALYTICS," "ADOBE AUDIENCE MANAGER," "ADOBE CAMPAIGN," and "ADOBE TARGET" are either registered trademarks or trademarks of Adobe Inc. in the United States and/or other countries.

Figure 8:
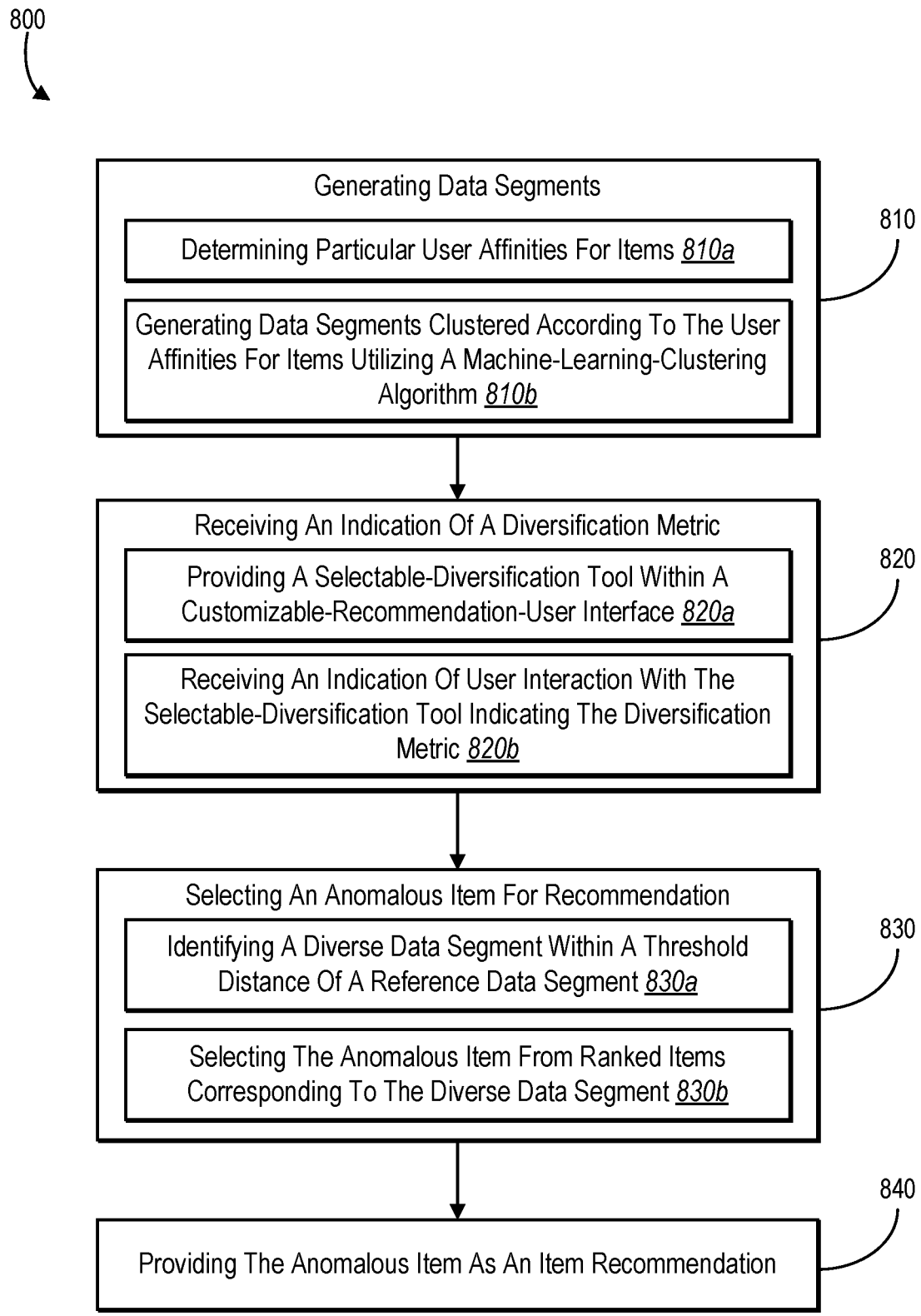
FIG. 8 illustrates a flowchart of a series of acts for determining a diverse item recommendation in accordance with one or more embodiments.

FIGS. 1-7, the corresponding text, and the examples provide a number of different methods, systems, devices, and non-transitory computer-readable media of the diverse recommendation system 106. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned above, FIG. 8 illustrates a flowchart of a series of acts 800 for determining a diverse item recommendation in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method (e.g., in a digital medium environment of computational analytics for diverse data segments). Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 include an act 810 of generating data segments. In particular, the act 810 can include generating a plurality of data segments representing user affinities for items. Furthermore, the act 810 can include generating a plurality of data segments utilizing a machine-learning-clustering algorithm. For instance, a machine-learning-clustering algorithm can include an unsupervised non-parametric clustering algorithm. In addition, the act 810 can include generating a plurality of data segments representing particular users from a set of users clustered according to affinities for particular items from a set of items. As further indicated by FIG. 8, the act 810 may include (i) an act 810a of determining particular user affinities for items, and (ii) an act 810b of generating data segments clustered according to the user affinities for items utilizing a machine-learning-clustering algorithm.

As shown in FIG. 8, the series of acts 800 include an act 820 of receiving an indication of a diversification metric. In particular, the act 820 can include receiving, from a client device, an indication of a selection by a user of a diversification metric reflecting a degree of diversification in item recommendations. As further indicated by FIG. 8, the act 820 may include (i) an act 820a of providing a selectable-diversification tool within a customizable-recommendation-user interface, and (ii) an act 820b of receiving an indication of a user interaction with the selectable-diversification tool indicating the diversification metric.

For instance, the act 820 can include receiving, from a client device via user interaction with a selectable-diversification tool within a customizable-recommendation-user interface, an indication of a selection by a user of a diversification metric reflecting a degree of diversification in item recommendations. Furthermore, the act 820 can include receiving, from a client device, an indication of a selection by a user of a diversification metric by receiving an indication of a user interaction with a slider tool within a customizable-recommendation-user interface (for item-recommendation-preference settings). For example, a selectable-diversification tool can include a slider tool within a customizable-recommendation-user interface. For instance, a slider tool can indicate a range of values corresponding to a degree of diversification in item recommendations.

In addition, the act 820 can include receiving, from a client device via user interaction with a selectable-frequency tool within a customizable-recommendation-user interface, an indication of a selection by a user of a frequency metric indicating a frequency with which the user receives recommendations of anomalous items. Moreover, the act 820 can include utilizing a diversification metric to determine a frequency metric indicating a frequency with which a user receives recommendations of anomalous items. Additionally, the act 820 can include receiving, from a client device via user interaction with a selectable-time tool within a customizable-recommendation-user interface, an indication of a selection by a user of a time metric indicating a time period in which the user receives recommendations of anomalous items.

As shown in FIG. 8, the series of acts 800 include an act 830 of selecting an anomalous item for recommendation. In particular, the act 830 can include identifying, from among a plurality of data segments, a reference data segment corresponding to a user and a diverse data segment within a threshold distance of the reference data segment as indicated by a diversification metric. As further indicated by FIG. 8, the act 830 may include (i) an act 830a of identifying a diverse data segment within a threshold distance of a reference data segment, and (ii) an act 830b of selecting an anomalous item from ranked items corresponding to the diverse data segment.

For instance, the act 830 can include selecting an anomalous item corresponding to a diverse data segment for recommendation to a user. In addition, the act 830 can include selecting an anomalous item for recommendation to a user by identifying, from among a plurality of data segments, a diverse data segment within a threshold distance of a reference data segment corresponding to a user, as indicated by a diversification metric, and selecting the anomalous item from among items corresponding to the diverse data segment based on item rankings of the items.

Furthermore, the act 830 can include identifying a reference data segment corresponding to a user by identifying, from among a plurality of data segments, a data segment including a multidimensional datapoint representing the user. Additionally, the act 830 can include identifying a diverse data segment by identifying a plurality of neighboring data segments within a threshold distance of a reference data segment and selecting, from among the plurality of neighboring data segments, a data segment having a greatest distance from the reference data segment as the diverse data segment.

In addition, the act 830 can include selecting an anomalous item corresponding to a diverse data segment by selecting the anomalous item from among items corresponding to the diverse data segment based on item rankings of the items. Furthermore, the act 830 can include ranking items based on user-preference scores reflecting preference factors for the items. For instance, preference factors can include at least one of clicks on websites associated with particular items, purchases of the particular items, available quantity of the particular items, views of the particular items, pricing of the particular items, or interaction trends associated with the particular items. Additionally, the act 830 can include determining user-preference scores utilizing weights based on a dataset (or portion of a dataset) reflecting user behavior of a user. Furthermore, the act 830 can include selecting an anomalous item by selecting an item from among items corresponding to a highest user-preference score from user-preference scores (of the items).

As shown in FIG. 8, the series of acts 800 include an act 840 of providing an anomalous item as an item recommendation. In particular, the act 840 can include providing an anomalous item as an item recommendation for display on a client device. For example, an anomalous item can include a product or a media-content item. Moreover, an anomalous-item recommendation can include an anomalous-product recommendation or an anomalous-media-content-item recommendation.

In addition to (or in alternative to) the acts above, the diverse recommendation system 106 can also perform a step for determining an anomalous-item recommendation for a user based on a plurality of data segments generated utilizing a machine-learning-clustering algorithm and a diversification metric. For instance, the acts and algorithms described above in relation to FIGS. 5A-5C (e.g., the acts 502-522) can comprise the corresponding acts and algorithms for performing a step for determining an anomalous-item recommendation for a user based on a plurality of data segments generated utilizing a machine-learning-clustering algorithm and a diversification metric.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
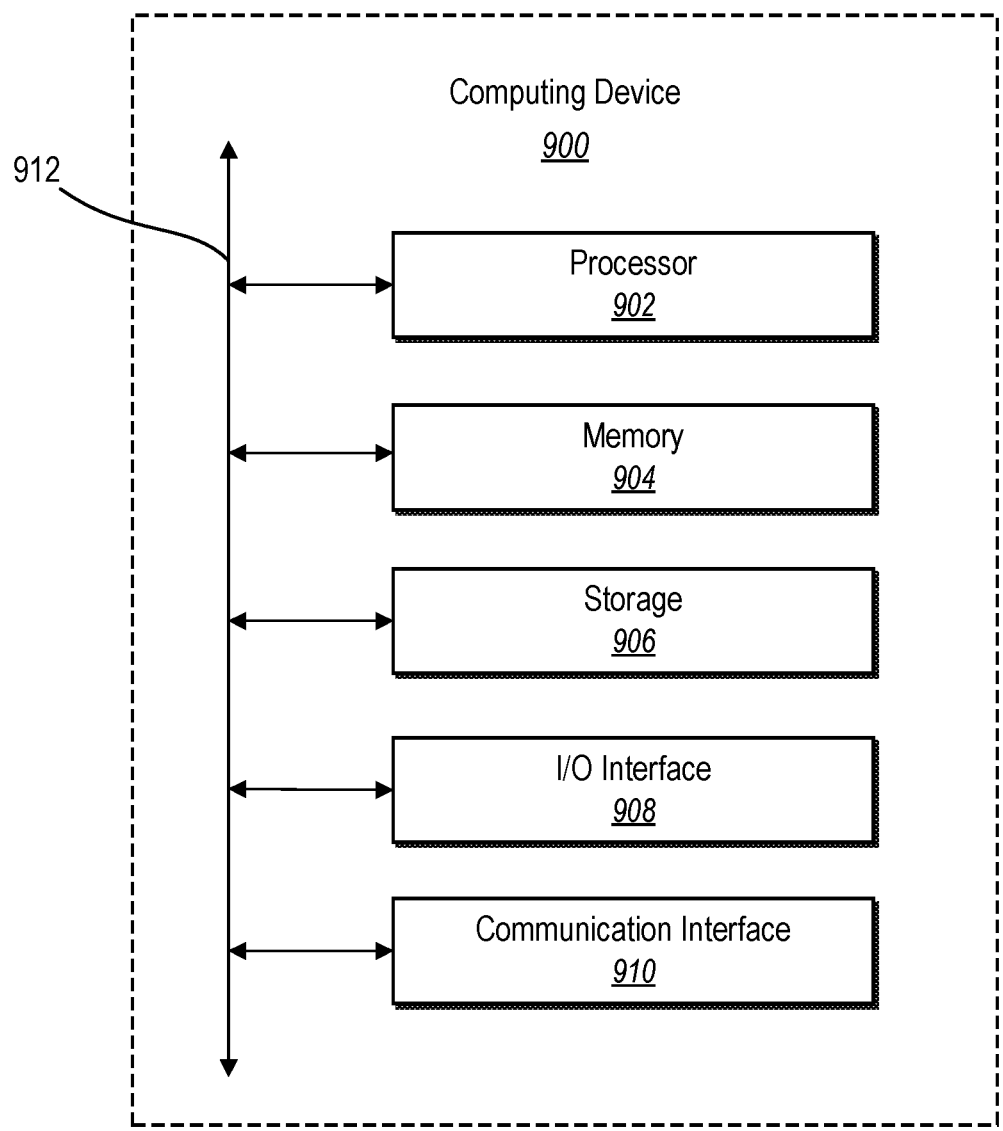
FIG. 9 illustrates a block diagram of an example computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., computing device 700, server device(s) 102, administrator device 114, and client devices 110a-110n). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    generate, utilizing a machine-learning-clustering algorithm, a plurality of data segments representing particular users from a set of users clustered according to affinities for particular items from a set of items;
    receive, from a client device via user interaction with a selectable-diversification tool within a customizable-recommendation-user interface, an indication of a selection by a user of a diversification metric reflecting a degree of diversification in item recommendations;
    identify, from among the plurality of data segments generated utilizing the machine-learning-clustering algorithm, a reference data segment corresponding to the user and a diverse data segment within a threshold distance of the reference data segment as indicated by the diversification metric;
    select an anomalous item corresponding to the diverse data segment for recommendation to the user; and
    provide the anomalous item as an item recommendation for display on the client device.

2. The non-transitory computer-readable medium of claim 1, further comprising instructions that, when executed by the at least one processor, cause the computing device to receive, from the client device via user interaction with a selectable-frequency tool within the customizable-recommendation-user interface, an indication of a selection by the user of a frequency metric indicating a frequency with which the user receives recommendations of anomalous items.

3. The non-transitory computer-readable medium of claim 1, further comprising instructions that, when executed by the at least one processor, cause the computing device to:
    identify the reference data segment corresponding to the user by identifying, from among the plurality of data segments generated utilizing the machine-learning-clustering algorithm, a data segment comprising a multidimensional datapoint representing the user; and
    identify the diverse data segment from among the plurality of data segments by:
        identifying a plurality of neighboring data segments within the threshold distance of the reference data segment; and
        selecting, from among the plurality of neighboring data segments, a data segment having a greatest distance from the reference data segment as the diverse data segment.

4. The non-transitory computer-readable medium of claim 1, further comprising instructions that, when executed by the at least one processor, cause the computing device to receive, from the client device, the indication of the selection by the user of the diversification metric by receiving an indication of a user interaction with the selectable-diversification tool as a slider tool within the customizable-recommendation-user interface for item-recommendation-preference settings.

5. The non-transitory computer-readable medium of claim 1, wherein the anomalous item comprises a product or a media-content item.

6. The non-transitory computer-readable medium of claim 1, further comprising instructions that, when executed by the at least one processor, cause the computing device to select the anomalous item corresponding to the diverse data segment by selecting the anomalous item from among items corresponding to the diverse data segment based on item rankings of the items.

7. The non-transitory computer-readable medium of claim 6, further comprising instructions that, when executed by the at least one processor, cause the computing device to rank the items based on user-preference scores reflecting preference factors for the items.

8. The non-transitory computer-readable medium of claim 7, wherein the preference factors comprise at least one of clicks on websites associated with particular items, purchases of the particular items, available quantity of the particular items, views of the particular items, pricing of the particular items, or interaction trends associated with the particular items.

9. The non-transitory computer-readable medium of claim 7, further comprising instructions that, when executed by the at least one processor, cause the computing device to determine the user-preference scores utilizing weights based on a dataset reflecting user behavior of the user.

10. A system comprising:
   one or more memory devices comprising a first dataset for a set of users and a second dataset for a set of items; and
   one or more server devices configured to cause the system to:
      generate, utilizing a machine-learning-clustering algorithm, a plurality of data segments representing particular users from the set of users clustered according to affinities for particular items from the set of items;
      generate, for display on a client device, a customizable-recommendation-user interface comprising a selectable-diversification tool to configure diversification metrics;
      receive, from the client device via user interaction with the selectable-diversification tool within the customizable-recommendation-user interface, an indication of a selection by a user of a diversification metric reflecting a degree of diversification in item recommendations;
      select an anomalous item for recommendation to the user by:
         identifying, from among the plurality of data segments generated utilizing the machine-learning-clustering algorithm, a diverse data segment within a threshold distance of a reference data segment corresponding to the user, as indicated by the diversification metric; and
         selecting the anomalous item from among items corresponding to the diverse data segment based on item rankings of the items; and
      provide the anomalous item as an item recommendation for display on the client device.

11. The system of claim 10, wherein the one or more server devices are configured to utilize the diversification metric to determine a frequency metric indicating a frequency with which the user receives recommendations of anomalous items.

12. The system of claim 10, wherein the one or more server devices are further configured to cause the system to receive, from the client device via user interaction with a selectable-time tool within the customizable-recommendation-user interface, an indication of a selection by the user of a time metric indicating a time period in which the user receives recommendations of anomalous items.

13. The system of claim 10, wherein the selectable-diversification tool comprises a slider tool within the customizable-recommendation-user interface, the slider tool indicating a range of values corresponding to the degree of diversification in item recommendations.

14. The system of claim 10, wherein the one or more server devices are configured to cause the system to select the anomalous item by ranking the items based on user-preference scores reflecting preference factors for the items.

15. The system of claim 14, wherein the one or more server devices are configured to cause the system to select the anomalous item by selecting an item from among the items corresponding to a highest user-preference score from the user-preference scores.

16. The system of claim 14, wherein the one or more server devices are configured to cause the system to determine the user-preference scores utilizing weights based on a portion of the first dataset reflecting user behavior of the user.

17. In a digital medium environment of computational analytics for diverse data segments, a computer-implemented method comprising:
   generating, utilizing a machine-learning-clustering algorithm, a plurality of data segments representing user affinities for items;
   receiving, from a client device, an indication of a selection by a user of a diversification metric reflecting a degree of diversification in item recommendations;
   performing a step for determining an anomalous-item recommendation for the user based on the plurality of data segments generated utilizing the machine-learning-clustering algorithm and the diversification metric; and
   providing the anomalous-item recommendation for display on the client device.

18. The computer-implemented method of claim 17, further comprising receiving, from the client device, the indication of the selection by the user of the diversification metric by receiving an indication of a user interaction with the selectable-diversification slider tool within a customizable-recommendation-user interface, wherein the selectable-diversification slider tool indicates a range of values corresponding to the degree of diversification in item recommendations.

19. The computer-implemented method of claim 17, wherein the anomalous-item recommendation comprises an anomalous-product recommendation or an anomalous-media-content-item recommendation.

20. The computer-implemented method of claim 17, further comprising generating the plurality of data segments utilizing an unsupervised non-parametric clustering algorithm as the machine-learning-clustering algorithm.

* * * * *